United States Patent
Fukuda et al.

[11] Patent Number: 5,995,344
[45] Date of Patent: Nov. 30, 1999

[54] DISC CARTRIDGE HAVING DESIGN PARAMETERS OF A RECORDING AND/OR REPRODUCTION MEDIUM HOUSED THEREIN

[75] Inventors: Taizo Fukuda; Ryoki Watanabe; Yuji Iwaki; Shinji Masugi, all of Miyagi, Japan

[73] Assignee: Sony Corporation, Tokyo, Japan

[21] Appl. No.: 08/872,468

[22] Filed: Jun. 10, 1997

[30] Foreign Application Priority Data

Jun. 14, 1996 [JP] Japan ................................ 8-154661
Jun. 14, 1996 [JP] Japan ................................ 8-154662

[51] Int. Cl.⁶ ...................................... G11B 7/24
[52] U.S. Cl. ............................. 360/133; 369/291
[58] Field of Search ............................ 360/133; 369/291

[56] References Cited

U.S. PATENT DOCUMENTS

| 5,091,901 | 2/1992 | Yamamoto et al. | 369/291 |
| 5,272,693 | 12/1993 | Fujisawa | 369/291 |
| 5,367,422 | 11/1994 | Fujisawa et al. | 360/133 |
| 5,467,239 | 11/1995 | Fujisawa | 360/133 |
| 5,530,691 | 6/1996 | Fujisawa | 369/291 |
| 5,745,451 | 4/1998 | Mukawa et al. | 369/44.29 |

FOREIGN PATENT DOCUMENTS

| 0 657 885 A2 | 6/1995 | European Pat. Off. |  |
| 1-118278 | 5/1989 | Japan | 360/133 |
| 2-172083 | 7/1990 | Japan | 360/133 |
| 3-183079 | 8/1991 | Japan | 360/133 |
| 6-242639 | 4/1996 | Japan . | |
| 7-150159 | 1/1997 | Japan . | |
| 7-218547 | 3/1997 | Japan . | |
| 8-118619 | 11/1997 | Japan . | |
| 8-165604 | 11/1997 | Japan . | |
| 8-145796 | 12/1997 | Japan . | |

*Primary Examiner*—Brian E. Miller
*Attorney, Agent, or Firm*—Limbach & Limbach LLP; Seong-Kun Oh

[57] ABSTRACT

A disc cartridge having a disc for recording information signals and a main cartridge body member for rotatably housing the disc. The disc cartridge is designed to be loaded on a recording and/or reproducing apparatus. The main cartridge body member has, on its one surface, a label area for bonding a display label indicating the recording contents of the information signals, while having, on its other surface, a spindle hole for rotating the disc by the recording and/or reproducing apparatus. The main cartridge body member has a design parameter discriminating hole extending along the back side opposite to the front side in the cartridge inserting direction. The recording capacity or design parameters of the disc housed within the main cartridge body member may be discriminated by detecting the design parameter discriminating hole.

51 Claims, 18 Drawing Sheets

20

DISC CARTRIDGE HAVING DESIGN PARAMETERS OF A RECORDING AND/OR REPRODUCTION MEDIUM HOUSED THEREIN

BACKGROUND OF THE INVENTION

1. Field of the Invention

This invention relates to a disc cartridge having rotatably housed therein a disc, having information signals recorded thereon, such as a magnetic disc or an optical disc. More particularly, it relates to a disc cartridge having a main cartridge body member having discrimination holes for specifying the design parameters of a disc accommodated therein, such as a recording capacity.

2. Description of the Related Art

Heretofore, a disc cartridge 90, having housed therein an information-recording disc, such as a magnetic disc or an optical disc, has a main cartridge body member which is comprised of an upper cartridge half 91 and a lower cartridge half 92 combined together. Within this main cartridge body member 98 is rotatably housed a disc. In the upper and lower surface of the main cartridge body member 98 are formed recording/reproducing apertures, not shown, for facing each other. On the main cartridge body member 98 is movably mounted a shutter member 93 for opening/closing the recording/reproducing apertures, as shown in FIGS. 1 and 2.

Centrally of the lower cartridge half 92 of the main cartridge body member 98 is formed an opening 94 for entrance of a turntable provided on a recording and/or reproducing apparatus, not shown. This opening 94 for table entrance permits a center hub 95 mounted centrally of the disc housed within the main cartridge body member 98 to be exposed to outside the main cartridge body member 98.

The main cartridge body member 98 includes a mistaken erasure inhibiting member 96 for preventing erasure of previously recorded information signals caused by mistaken overwriting of new information signals on the disc housed within the main cartridge body member 98. This mistaken erasure inhibiting member 96 opens or closes a mistaken recording discriminating hole 97 formed in the main cartridge body member 98 for switching between the state of enabling the recording of the information signals and the state of disabling the recording of the information signals on the disc. The main cartridge body member 98 also has recording capacity discriminating holes 99A, 99B for discriminating the recording capacity of the disc housed therein.

The information signals handled by the information processing apparatus have become diversified, such picture or speech data as well as text data are handled by the information processing apparatus, and the information volume handled at a time is also increasing. For efficient transmission or recording of the large-capacity information, it is necessary to increase the recording capacity of the disc cartridge 90 used as a recording medium for information signals.

Thus, such a disc cartridge is proposed in which a disc contained in the main body member has a different recording capacity despite substantially common outer size or design parameters of the disc cartridge. Thus it becomes necessary to provide suitable discrimination means for discriminating the recording capacity of the disc housed within the disc cartridge for discriminating whether or not the disc can be used on the recording/reproducing apparatus.

As a disc cartridge having means for discriminating the recording capacity of the disc housed therein, one configured as shown in FIG. 3 is proposed. Such disc cartridge 101, shown in FIG. 3, has housed therein a disc having a recording capacity of not more than 1 megabytes (MB), and is designed to indicate the recording capacity by capacity display 101a, 101b formed by printing or impression on a shutter member 93 mounted for movement on the main cartridge body member 98 or on the main cartridge body member 98.

Another disc cartridge 102, shown in FIG. 4, has housed therein a disc having a storage capacity of 2 MB. For distinction from other disc cartridges housing therein discs having different recording capacities of not more than 2 MB, this disc cartridge 102 has, in its lower half 102A, a recording capacity discrimination hole 110 in a lateral side thereof facing the lateral side provided with the mistaken erasure inhibiting member 96. The disc cartridge 102, having housed therein the disc having the recording capacity of 2 MB, has its recording capacity detected by the recording and/or reproducing apparatus detecting the recording capacity discrimination hole 110 on loading the disc cartridge 102 on the recording and/or reproducing apparatus.

A disc cartridge 103, shown in FIG. 5, has housed therein a disc having a recording capacity of 4 MB. For distinction from the disc cartridge 102 housing therein a disc having the recording capacity of 2 MB, the disc cartridge 103 has, in its lower half 103A, a recording capacity discrimination hole 111 offset from the recording capacity discrimination hole 110 provided in the disc cartridge 102 for 2 MB disc.

A disc cartridge 104, shown in FIG. 6, has housed therein a disc having a recording capacity of 13 MB, while a disc cartridge 105, shown in FIG. 7, has housed therein a disc having a recording capacity of 21 MB. For distinction from the disc cartridges 101, 102 and 103 housing therein discs having different recording capacities, the disc cartridges 104, 105 have lower cartridge halves 104A, 105A thereof making up the main cartridge body members 98 formed with mistaken erasure inhibiting members 106 and recording capacity discriminating holes 112. These mistaken erasure inhibiting members 106 and recording capacity discriminating holes 112 are formed at reversed relative positions with respect to the mistaken erasure inhibiting members 97 and recording capacity discriminating holes 110 of the disc cartridges 101 to 103 for discs having different recording capacities. The mistaken erasure inhibiting members 106 are arranged for movement within openings 107 formed in the lower cartridge halves 98 for opening or closing the openings 107 formed in the lower halves 104A, 105A.

The recording capacity discrimination hole 112, formed in each of the disc cartridge 104 for 13 MB disc and the disc cartridge 105 for 21 MB disc, is set to represent a state judged in the disc cartridge for a disc with 4 MB or less to be a writing inhibition state. That is, since the disc cartridge 104 or 105 is set to the writing inhibiting state, when loaded on the recording and/or reproducing apparatus for discs having a recording capacity of 4 MB or less, there is no risk of inadvertent erasure of the information signals as a result of writing of the information signals.

In the conventional disc cartridges 102 to 105, the recording capacity discrimination holes 110, 111 and 112 and the second recording capacity discrimination holes 113, 114 are formed on various sites on the major surfaces of the lower halves 102A to 105A making up the main cartridge body members.

Thus, for discriminating the recording capacity of the conventional disc cartridges 101 to 105, it is necessary for the user to visually check the capacity indications formed such as by printing on the shutter member 93 or on the main cartridge body member 98 to render it difficult to quickly check the recording capacity.

Moreover, the conventional disc cartridges 101 to 105 present a problem in that the user desiring to discriminate the recording capacity has no alternative but to visually check the recording capacity indications.

In addition, it is required of the disc cartridge to increase the recording capacity such that a disc cartridge having a recording capacity of 21 MB or more needs to be clearly distinguished from the above-mentioned conventional disc cartridges 101 to 105.

OBJECTS AND SUMMARY OF THE INVENTION

It is therefore an object of the present invention to provide a disc cartridge in which the recording capacity or design parameters of a disc accommodated within a main cartridge body member can be easily distinguished to permit facilitated distinction from disc cartridges having different recording capacities or design parameters.

It is another object of the present invention to provide a disc cartridge which, while having substantially common outer shape or sizes', permits facilitated discernment of the recording capacity or design parameters of the disc housed within the main cartridge body member.

It is yet another object of the present invention to provide a disc cartridge in which the recording capacity or design parameters of the disc housed within the main cartridge body member can be automatically discerned in association with the loading operation on the recording and/or reproducing apparatus.

In one aspect, the present invention provides a disc cartridge for loading on a recording and/or reproducing apparatus, having a disc for recording information signals and a main cartridge body member rotatably housing therein the disc, wherein the main cartridge body member has, on its one surface, a label area for bonding a display label indicating the recording contents of the information signals. The main cartridge body member has, on its other surface, a spindle hole for rotating the disc by the recording and/or reproducing apparatus. The main cartridge body member has a design parameter discriminating hole extending along the back side opposite to the front side in the cartridge inserting direction.

Preferably, the design parameter discriminating hole is formed in line symmetry with respect to the centerline of the main cartridge body member extending parallel to the cartridge inserting direction.

Preferably, the design parameter discriminating hole is formed on a straight line lying at right angles to the cartridge inserting direction.

Preferably, the main cartridge body member has, next to the design parameter discriminating hole, a mistaken erasure inhibiting member for controlling recording of information signals on the disc.

Preferably, the main cartridge body member has, next to the design parameter discriminating hole, a recording capacity discriminating hole for discriminating the recording capacity of the information signals.

Also preferably, the main cartridge body member is made up of an upper half and a lower half, combined together. The upper half and the lower half are of different colors.

In another aspect, the present invention provides a recording and/or reproducing apparatus for recording and/or reproducing information signals on or from a disc cartridge including a main cartridge body member having, on its one surface, a label area for bonding a display label indicating the recording contents of information signals. The main cartridge body member has, on its other surface, a spindle hole for rotating the disc. The main cartridge body member has a design parameter discriminating hole extending along the back side opposite to the front side in the cartridge inserting direction. The apparatus includes detection means for detecting the design parameter discrimination hole.

In yet another aspect, the present invention provides a disc cartridge having a disc for recording information signals and a main cartridge body member rotatably housing a disc therein, wherein the main cartridge body member has a design parameter discrimination portion on a lateral side thereof extending parallel to the cartridge inserting direction.

Preferably, the design parameter discrimination portion has, on at least one lateral surface of the main cartridge body member extending parallel to the cartridge inserting direction, a groove formed through the entire thickness of the main cartridge body member or a planar portion comprised of a lateral surface and a major surface flush with the outer peripheral surface.

Preferably, the design parameter discrimination portion has, on one lateral surface of the main cartridge body member extending parallel to the cartridge inserting direction, a recess opened on the lateral surface and the major surface. The design parameter discrimination portion has, on the opposite lateral surface of the main cartridge body member extending parallel to the cartridge inserting direction, a planar portion comprised of a lateral surface and the major surface flush with the outer peripheral surface.

Preferably, the design parameter discrimination portion has, on one lateral surface of the main cartridge body member extending parallel to the cartridge inserting direction, a recess opened on the lateral surface and the major surface. The design parameter discrimination portion has, on the opposite lateral surface of the main cartridge body member extending parallel to the cartridge inserting direction, a groove formed through the entire thickness of the main cartridge body member.

Also preferably, the main cartridge body member has a positioning hole for positioning the main cartridge body member relative to a cartridge loading unit of a recording and/or reproducing apparatus when the main cartridge body member is loaded thereon. The design parameter discrimination portion having plural design parameter discrimination holes forwardly of the main cartridge body member with respect to the positioning hole.

DESCRIPTION OF THE PREFERRED EMBODIMENTS

Figure 1:
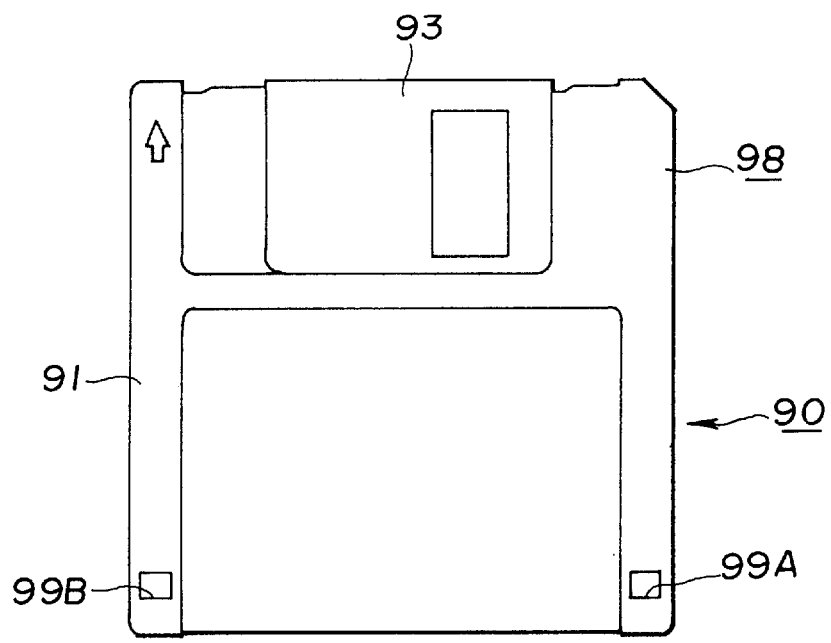
FIG. 1 is a plan view of a conventional disc cartridge looking from an upper half.
Figure 2:
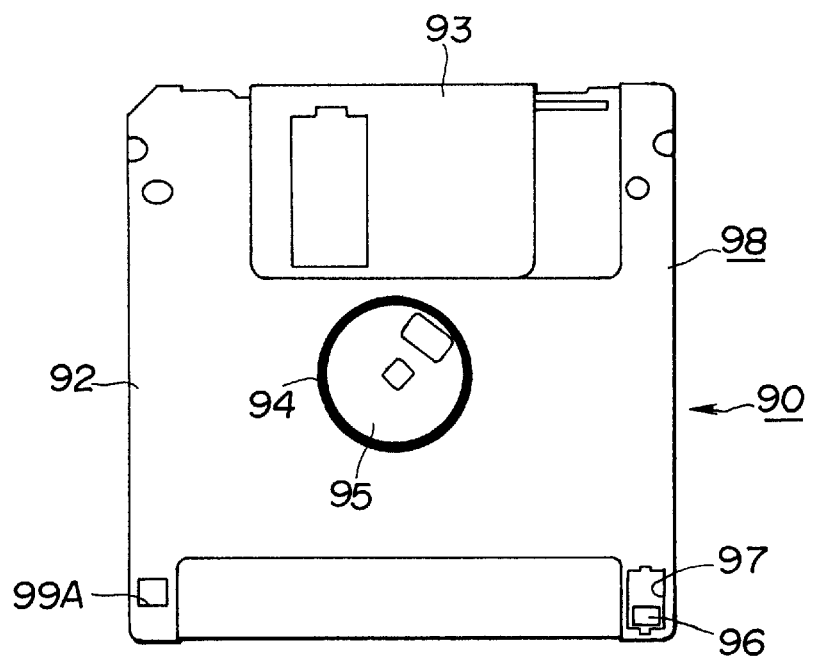
FIG. 2 is a bottom view showing a lower half of the disc cartridge.
Figure 3:
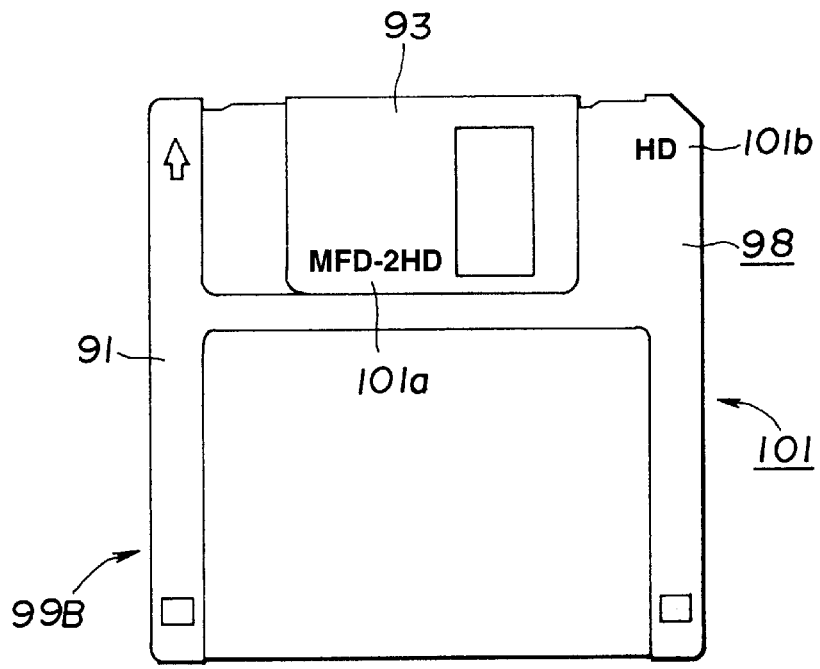
FIG. 3 is a plan view showing an upper half of another conventional disc cartridge.
Figure 4:
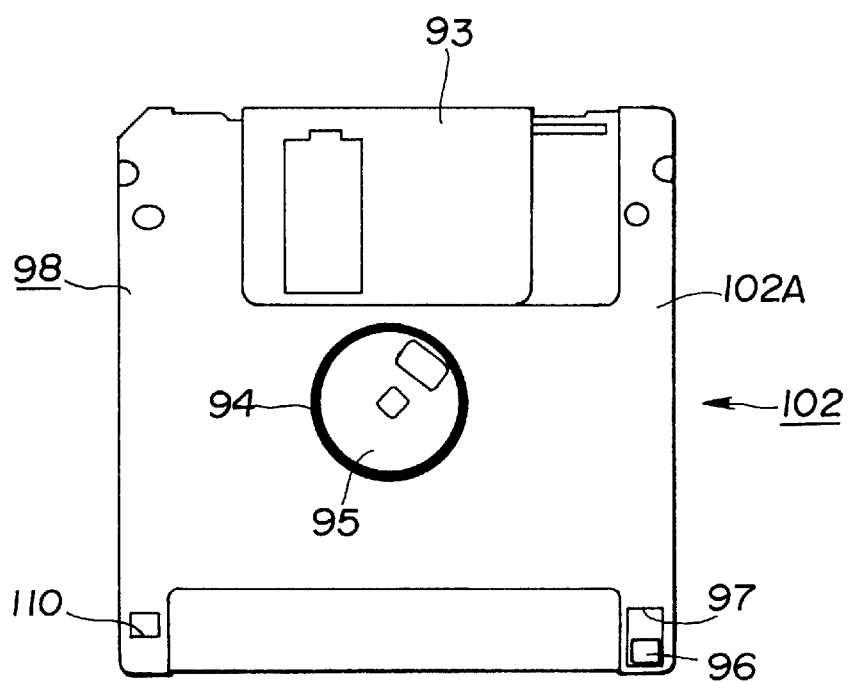
FIG. 4 is a plan view showing a recording capacity discrimination hole of the disc cartridge shown in FIG. 3.
Figure 5:
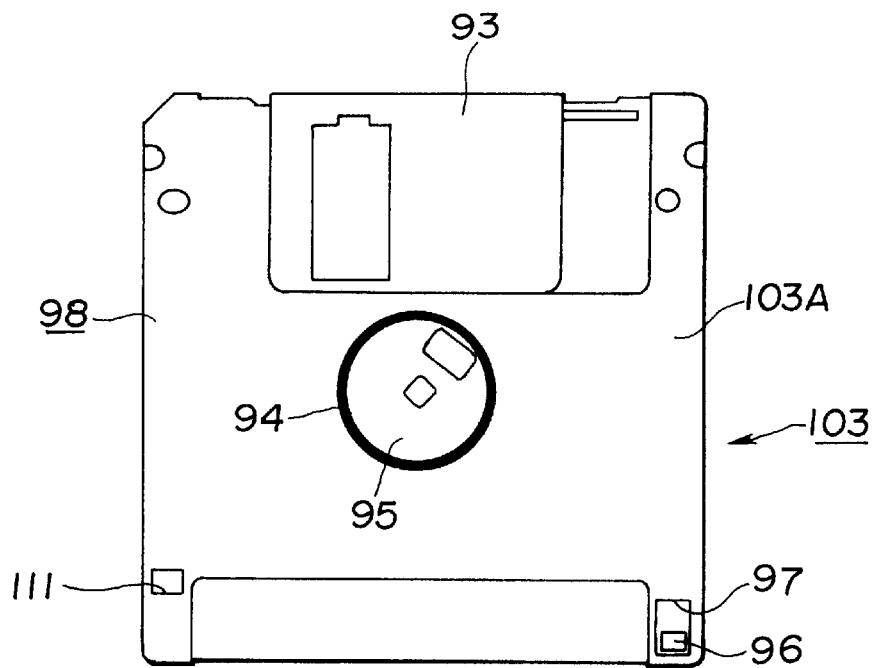
FIG. 5 is a plan view for illustrating the recording capacity discrimination hole shown in FIG. 4.
Figure 6:
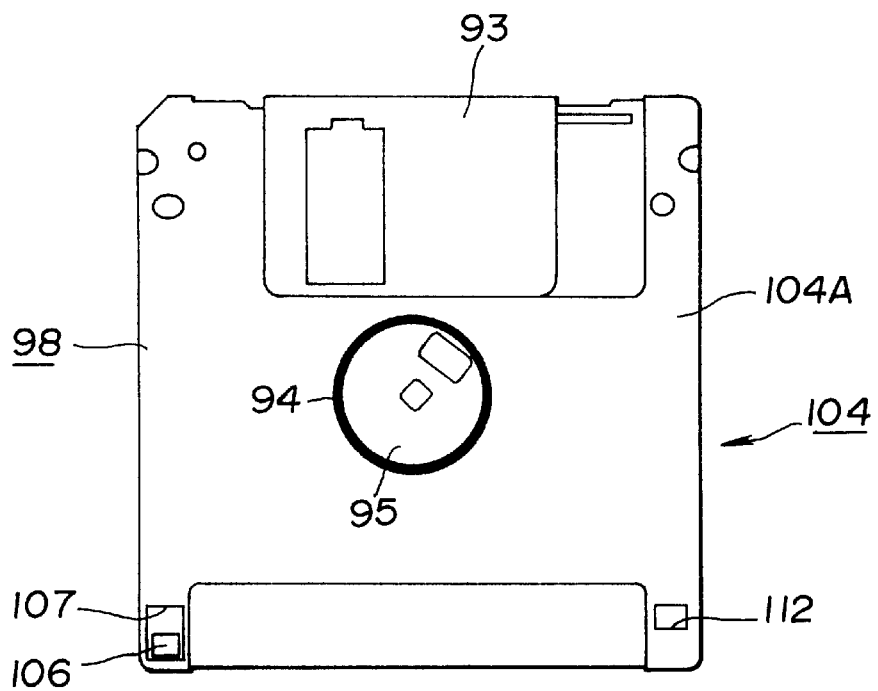
FIG. 6 is a plan view for illustrating a recording capacity discrimination hole of yet another conventional disc cartridge.
Figure 7:
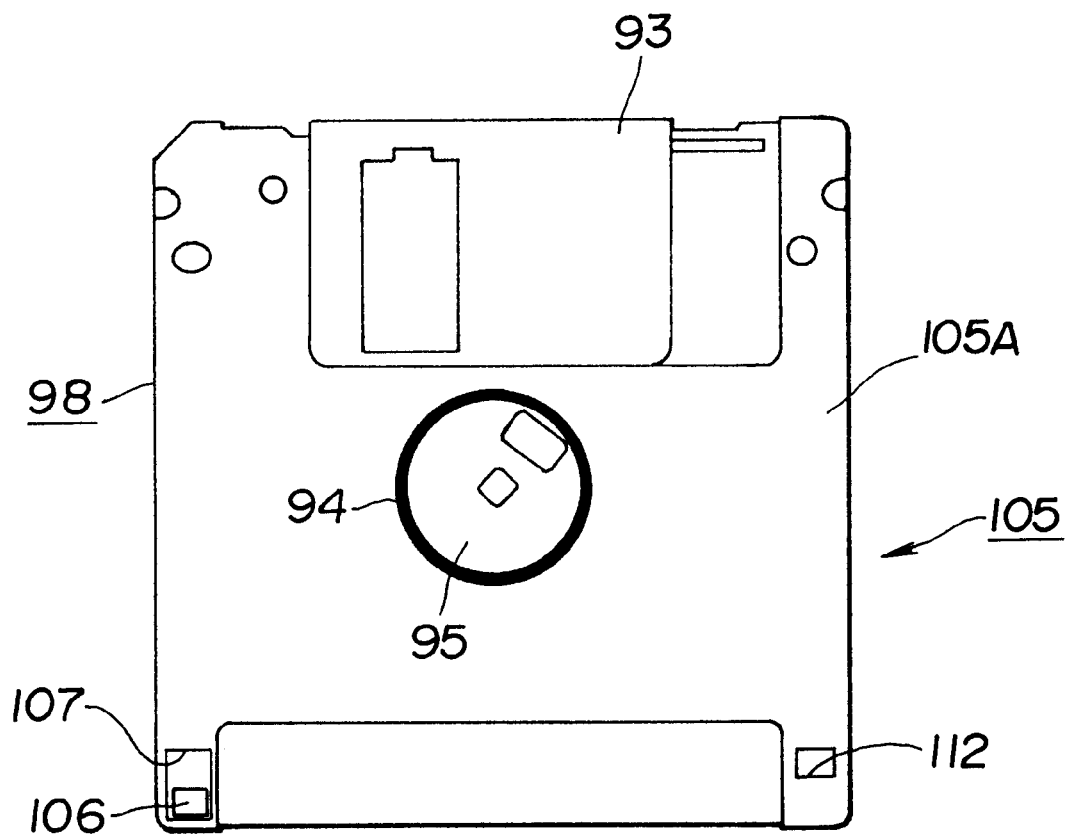
FIG. 7 is a plan view for illustrating a recording capacity discrimination hole of still another conventional disc cartridge.
Figure 8:
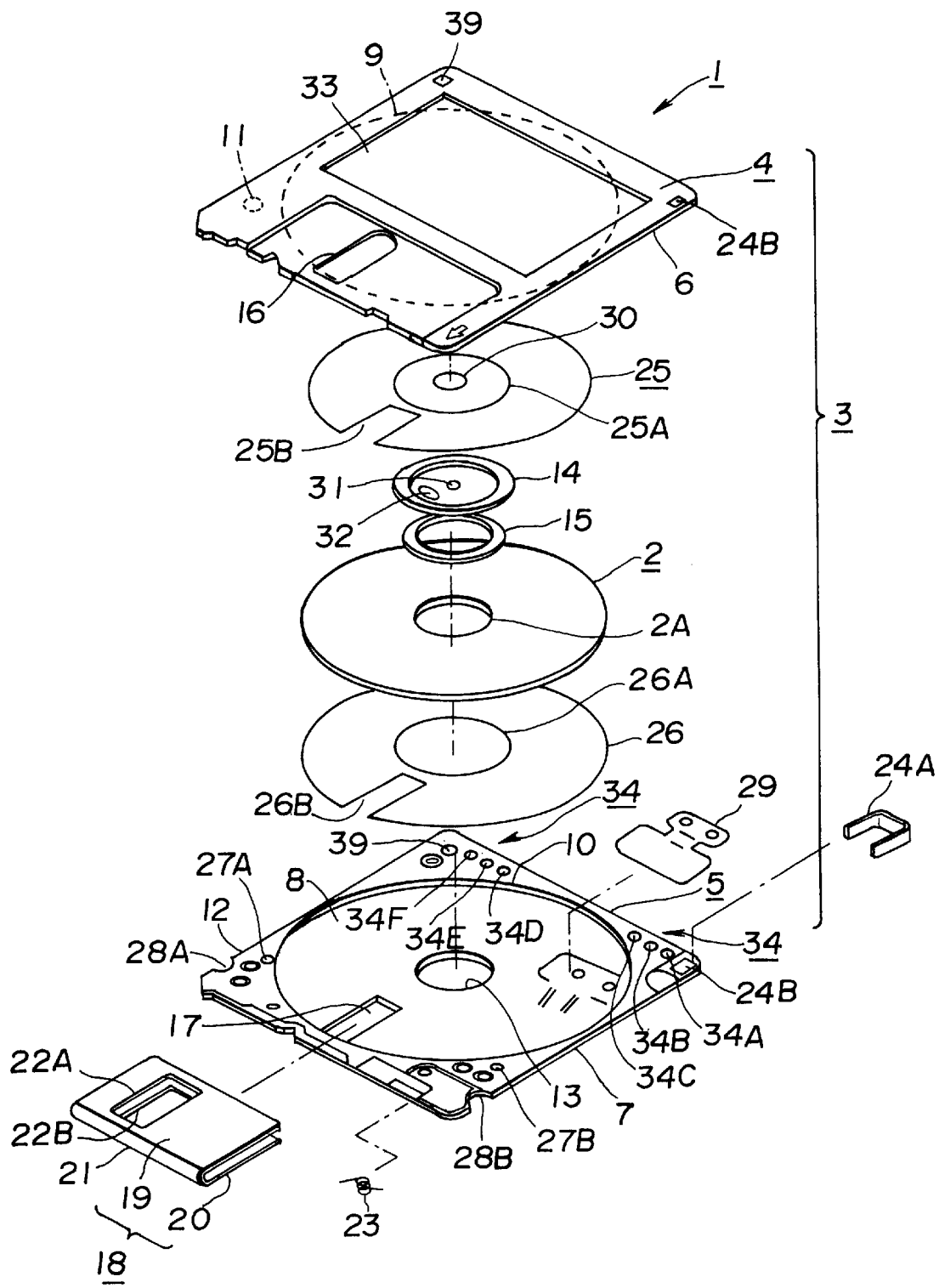
FIG. 8 is an exploded perspective view showing a first embodiment of a disc cartridge according to the present invention.

Referring to the drawings, preferred embodiments of a disc cartridge according to the present invention will be explained in detail.

A first embodiment of the disc cartridge according to the present invention is now explained.

A disc cartridge 1 of the first embodiment is adapted for housing a magnetic disc 2 having the diameter of 3.5 inches, and has a main cartridge body member 3 formed by abutting and connecting an upper half 4 and a lower half 5 to each other. The upper half 4 and the lower half 5 are molded from synthetic resin in a rectangular shape.

On the outer periphery of the upper half 4 and the lower half 5 constituting the main cartridge body member 3 are formed upstanding peripheral wall sections 6, 7 abutted to each other to form an outer peripheral wall of the main cartridge body member 3. On the inner facing surfaces of the upper half 4 and the lower half 5 are formed disc housing section delimiting wall sections 9, 10 and plural abutting fitting protrusions 11, 12. The disc housing section delimiting wall sections 9, 10 are formed as plural wall sections substantially inscribing the upstanding peripheral wall sections 6, 7 and are abutted to form a circular disc housing section 8.

By abutting the upstanding peripheral wall sections 6, 7 and the disc housing section delimiting wall sections 9, 10 to each other and by fitting the abutting fitting protrusions 11, 12 for assembling the upper and lower halves 4, 5, the abutting fitting 11, 12 protrusions are unified together by ultrasonic welding to form the main cartridge body member 3.

Centrally of the lower half 5 is formed a circular table entrance opening 13. Into this circular table entrance opening 13 is intruded a turntable of the recording/reproducing apparatus adapted for driving the magnetic disc 2 housed in the main cartridge body member 3 on loading the disc cartridge 1 on the recording/reproducing apparatus. A center hub 14 mounted via a mounting ring 15 for closing a center opening 2A of the magnetic disc 2 housed in the main cartridge body member 3 is caused to face the table entrance opening 13.

The center hub 14 is formed substantially as a coupling having a fitting portion of substantially the same diameter as the center opening 2A of the magnetic disc 2 and a flange formed as one on the outer perimeter of the fitting portion. When the disc cartridge 1 is loaded on the recording/reproducing apparatus, the center hub 14 has a spindle shaft opening 31 in which fits a spindle shaft provided on a turntable of the recording/reproducing apparatus intruded from the table entrance opening 13, and a chuck opening 32 in which fits a chuck protrusion provided on the turntable.

The upper half 4 and the lower half 5 are formed with recording/reproducing apertures 16, 17 for exposing at least portions of the signal recording area of the magnetic disc 2 housed within the disc housing unit 8 to the outside of the main cartridge body member 3 across the inner and outer rims of the disc. These recording/reproducing apertures 16, 17 are rectangular in shape and are disposed at mid portions along the width of the upper and lower halves 4 and 5 for extending from the position neighboring the table entrance opening 13 to the front side of the main cartridge body member 3.

On the main cartridge body member 3 is movably mounted a substantially U-shaped shutter member 18 made up of shutter portions 19, 20 and a connection portion 21 interconnecting the proximal ends of the shutter portions 19, 20. These shutter portions are molded from a synthetic resin material and extended parallel to each other. The shutter portions 19, 20 are formed with apertures 22A, 22B of substantially the same shape as the recording/reproducing apertures 16, 17, respectively.

The shutter member 18 is biased, by a shutter spring 23 provided at a front-side corner of the lower half 5, in a direction in which the apertures 22A, 22B are closed by the apertures 22A, 22B not being in register with the apertures 16, 17. When the disc cartridge 1 is not in use, the shutter member 18 closes the recording/reproducing apertures 16, 17 for preventing the dust and dirt from entering the disc housing section 8 via recording/reproducing apertures 16, 17 to be deposited on the magnetic disc 2 housed in the disc cartridge 1, as well as preventing damage to the magnetic disc 2.

On loading the disc cartridge 1 on the recording/reproducing apparatus, the shutter member 18 is moved along the main cartridge body member 3, against the bias of the shutter spring 23, by a shutter opening member of the recording/reproducing apparatus engaged with the front side of the main cartridge body member 3, to a position in which the apertures 22A, 22B are in register with the recording/reproducing apertures 16, 17 for opening the apertures 16, 17.

On a corner on the back side of the lower half 5 is movably mounted a mistaken erasure inhibiting member 24A. This mistaken erasure inhibiting member 24A is moved between a first position of closing a mistaken erasure detection hole 24B formed in the upper and lower halves 4 and 5 and a second position of opening the hole 24B. If the disc cartridge 1 is loaded on the recording/reproducing apparatus, with the mistaken erasure inhibiting member 24A having been moved to the first position of opening the mistaken erasure detection hole 24B, the mistaken erasure detection hole 24B is detected by mistaken erasure detection means of the recording/reproducing apparatus to inhibit recording of information signals on the magnetic disc 2. This prevents mistaken erasure of information signals recorded on the magnetic disc 2. With the mistaken erasure inhibiting member 24A having been moved to the second position of closing the mistaken erasure detection hole 24B, the detection hole 24B is not detected by the mistaken erasure detection means, thus enabling recording of information signals on the magnetic disc 2.

Between the inner wall surface and the magnetic disc 2, there is arranged an upper liner 25 connected to the upper half 4, whereas, between the inner surface of the lower half 5 and the magnetic disc 2, there is arranged a lower liner 26 connected to the lower half 26. The upper liner 25 and the lower liner 26 are of the same diameter as the magnetic disc 2 and are formed with center openings 26A, 26B larger in diameter than the center opening 2A of the magnetic disc 2. The upper liner 25 and the lower liner 26 are formed with cut-outs 25B, 26B extending from the outer rim to near the center openings 25A, 26A, respectively. These cut-outs 25B, 26B are slightly larger in size than the recording/reproducing apertures 16, 17 formed in the upper and lower halves 4 and 5, respectively.

An annular rib, not shown, is integrally formed at the center of the inner wall of the upper half 4 in register with the table entrance opening 13 of the lower half 5. This annular rib is of an outer diameter slightly smaller than the inner diameter of the center hub 14 of the magnetic disc 2. The annular rib is of a height slightly smaller than the height of the upstanding peripheral wall sections 6, 7 abutted to each other for defining an outer peripheral wall section of the disc cartridge 1. Thus, when the upper and lower halves 4, 5 are combined together, the annular rib is extended along the inner peripheral wall section of the center hub 14 of the magnetic disc 2 rotatably housed within the main cartridge body member 3. The magnetic disc 2 has the inner peripheral wall of the center hub 14 thereof controlled by the annular rib, so that it is controlled in movement in directions along its diameter and thickness. This assures smooth rotation of the disc within the inside of the main cartridge body member 3.

On the lower half 5, there is mounted a lifter 29 formed by bending a sheet material of a synthetic resin into a chevron shape. This lifter 29 thrusts the lower liner 26 against one of the surfaces of the magnetic disc 2 by an upstanding end portion of the lifter upwardly thrusting the lower surface of the lower liner 26 welded to the inner wall section of the lower half 5. On the inner wall section of the upper half 4 is bonded a center plate 30 molded from a wear-resistant synthetic resin material. On loading the disc cartridge 1 on the recording/reproducing apparatus, the center plate 30 controls the abutting height of the spindle shaft of the turntable entering the table entrance opening 13 formed in the lower half 5, while constituting a support for the upper surface of the center hub 14 assembled in the center opening 2A of the magnetic disc 2 for preventing abrasion and damage to the upper half 4.

When the disc cartridge 1 is loaded on the recording and/or reproducing apparatus and is rotated for recording/reproduction, the upper liner 25 and the lower liner 26 are brought into sliding contact with the upper and lower surfaces of the magnetic disc 2 with a light contact pressure under the operation of the lifter 29. The magnetic disc 2 is controlled in torque by the contact pressure of the upper liner 25 and the lower liner 26 to perform smooth rotation without producing non-uniformities in rotation.

In the lower half 5 are formed a pair of positioning holes 27A, 27B for positioning the disc cartridge 1 relative to the cartridge loading unit of the recording and/or reproducing apparatus. When insert into the recording and/or reproducing apparatus, the disc cartridge 1 is positively positioned relative to the cartridge loading unit by having the positioning holes 27A, 27B engaged by the positioning pins of the recording and/or reproducing apparatus. In both lateral sides along the cartridge inserting direction of the lower half 5 are formed engaging recesses 28A, 28B of a semi-circular cross-section. When the disc cartridge 1 is inserted into a recording and/or reproducing apparatus having an automatic loading unit or an automatic cartridge exchange unit, the engaging recesses 28A, 28B are engaged by a cartridge movement operating unit provided on the automatic loading unit or the automatic cartridge exchange unit.

Figure 9:
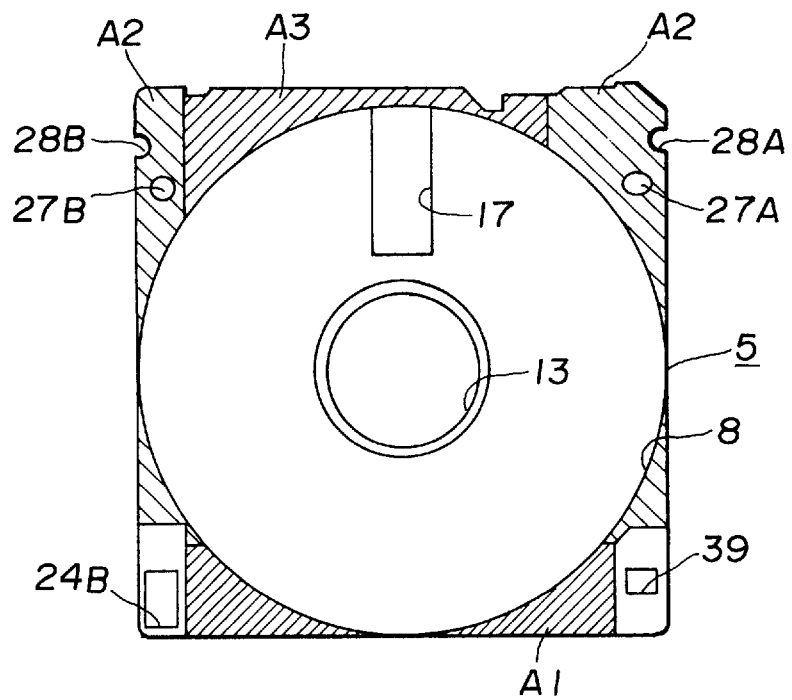
FIG. 9 is a plan view showing an inner portion of a lower half constituting the disc cartridge.
Figure 10:
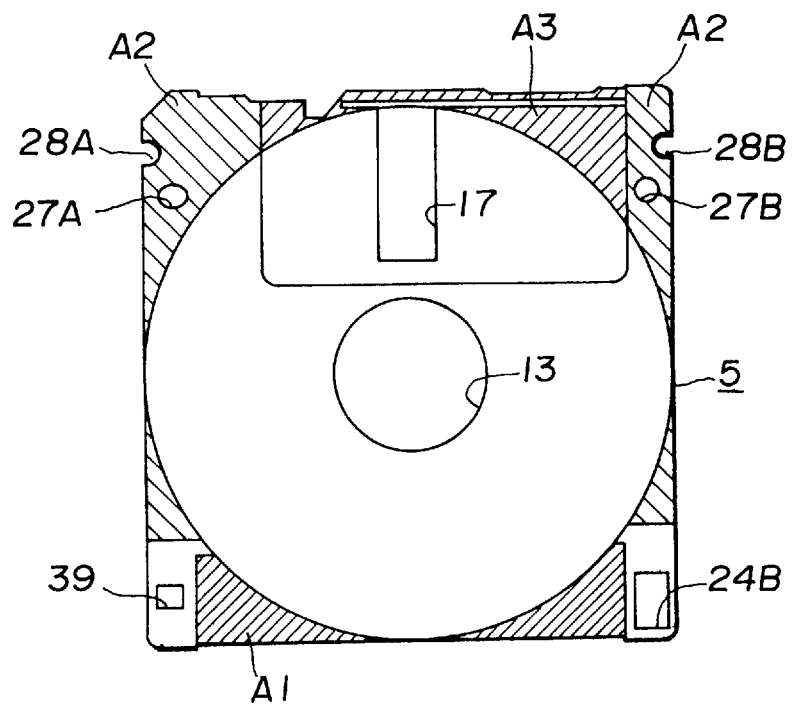
FIG. 10 is a plan view showing the outer side of the lower cartridge half constituting the disc cartridge.

In a planar portion of the lower half 5 excluding an area corresponding to the disc housing section 8, there are formed, in a first setting area A1, second setting areas A2 and in a third setting area A3, recording capacity discriminating holes for discriminating the recording capacity of the magnetic disc 2, as shown in FIGS. 9 and 10. The first setting area A1 is located on the back side facing the cartridge loading direction, while the second setting areas A2 are located on both sides of the cartridge loading direction and the third setting area A3 is located towards the cartridge loading direction.

Since the recording capacity discriminating holes provided in the third setting area A3 is adjacent to the shutter member 18 slid along the third setting area A3, it is necessary to take interference with the shutter member 18 sufficiently into account.

Figure 11:
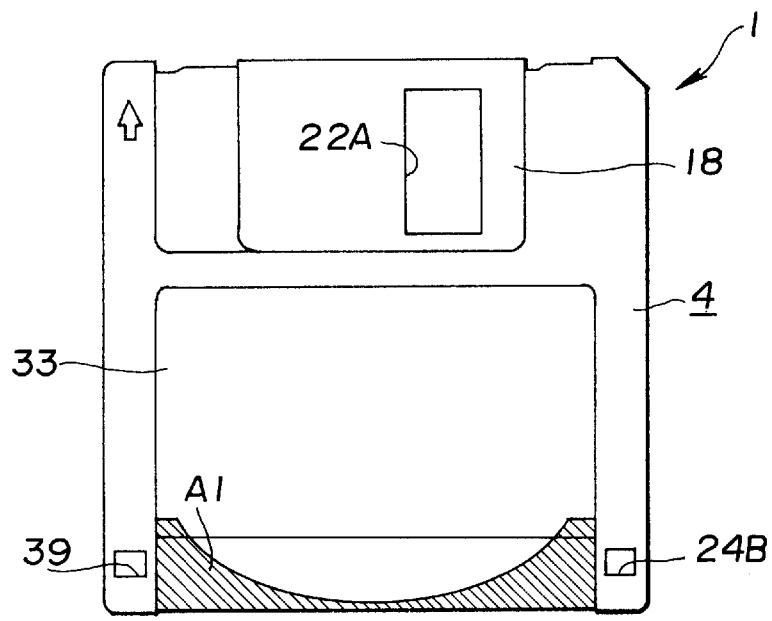
FIG. 11 is a plan view showing the lower half of the disc cartridge.
Figure 12:
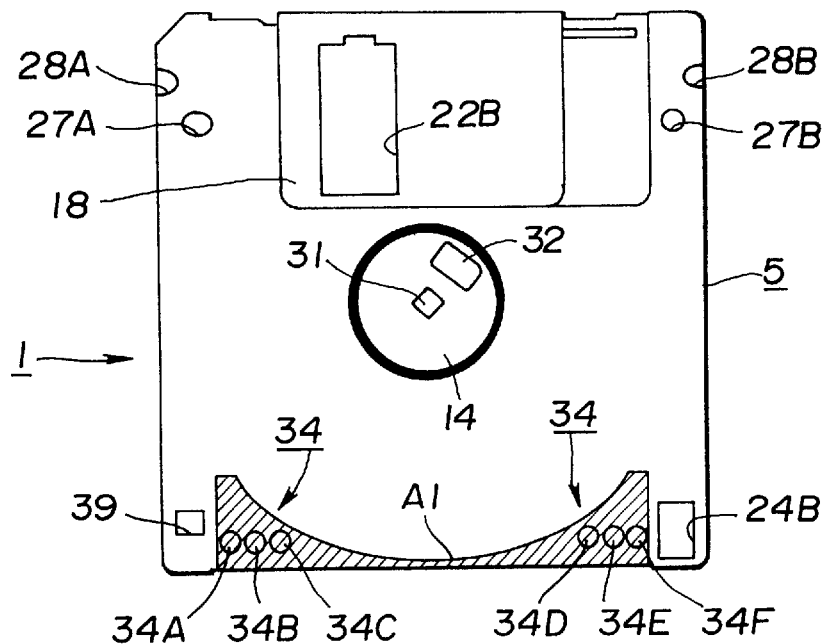
FIG. 12 is a bottom view showing the lower cartridge half of the disc cartridge.
Figure 13:
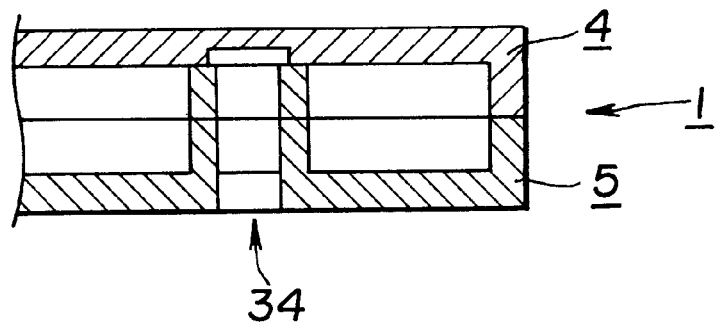
FIG. 13 is a longitudinal cross-sectional view showing a recording capacity discrimination hole formed in the disc cartridge.

In the lower half 5, there are formed, in the first setting area Al, first to sixth recording capacity discriminating holes 34A to 34F, as shown in FIGS. 11 and 12. These recording capacity discriminating holes 34 are formed as blind holes in the upper half 4, as shown in FIG. 13. Thus, when discriminated by a discriminating hole detection device 41, as later explained, the opening portions of the recording capacity discriminating holes are not stopped by labels used for indicating the recorded contents, thus eliminating the effect ascribable to the presence or absence of the labels bonded to a label area 33 of the upper half 5.

The main cartridge body member 3 may be provided with a label area facing the recording capacity discriminating holes 34. However, since the stroke of the main cartridge body member 3 along the thickness (direction of depth) is decreased in this case, the label area 33 is desirably provided so as to evade the area provided with the recording capacity discriminating holes 34, as shown in FIG. 11.

Figure 14:
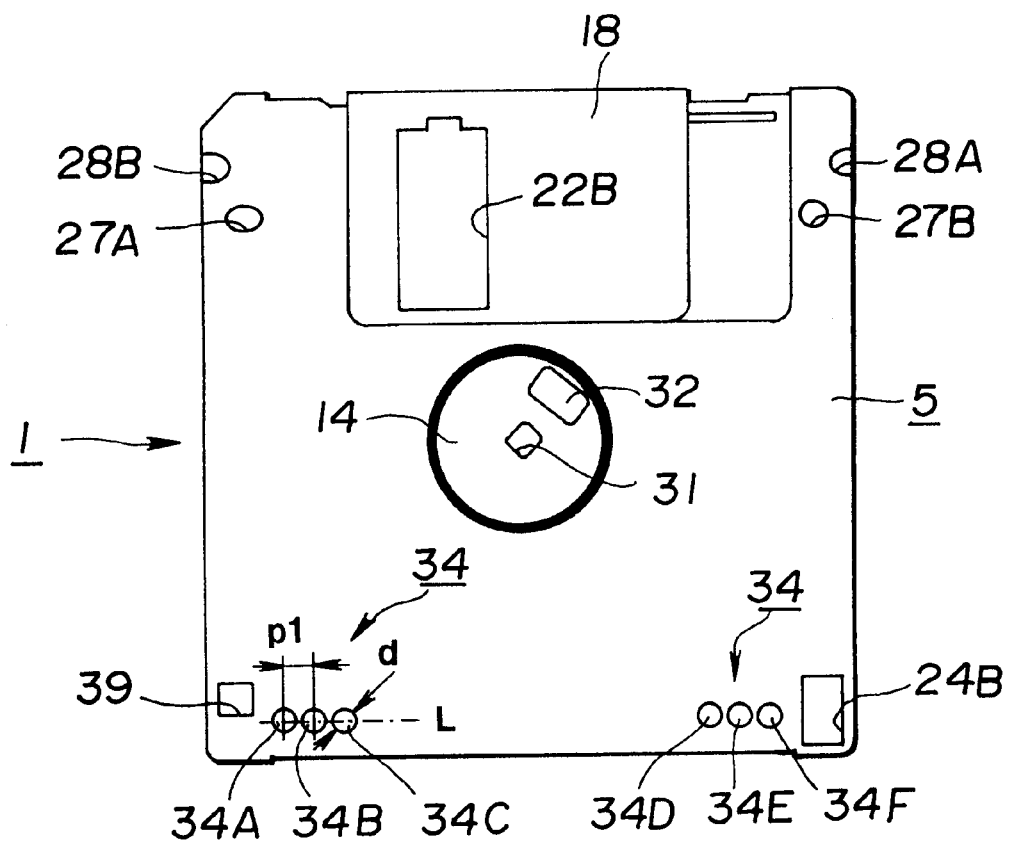
FIG. 14 is a plan view for illustrating the recording capacity discrimination hole provided on the disc cartridge.
Figure 15:
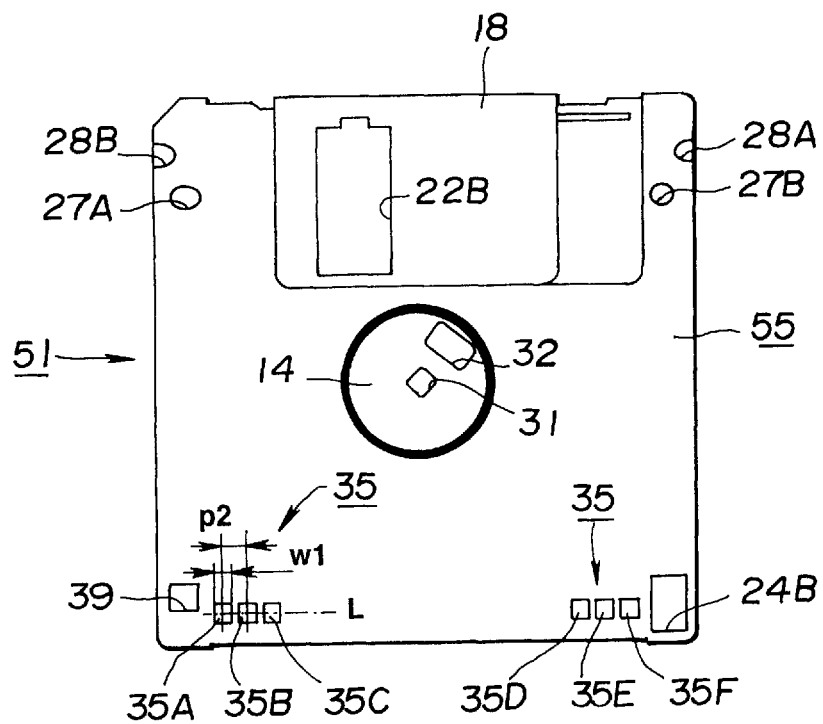
FIG. 15 is a plan view showing a second embodiment of a disc cartridge according to the present invention.
Figure 16:
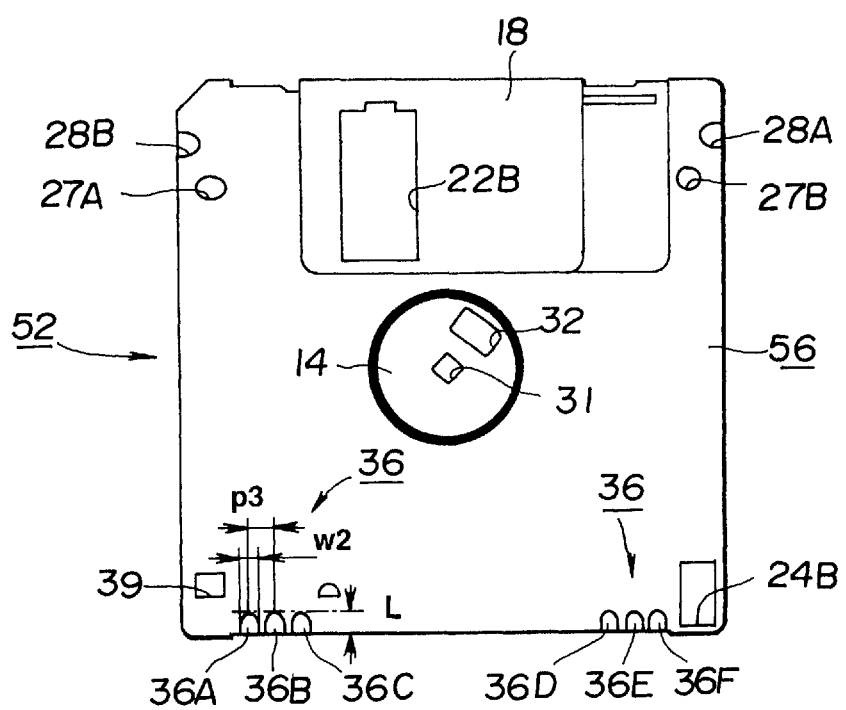
FIG. 16 is a plan view showing a third embodiment of a disc cartridge according to the present invention.

Referring to FIGS. 14 to 16, the size and the pitch of each of the recording capacity discriminating holes 34 formed in the lower half 5 are explained. The size along the direction of the depth of the recording capacity discriminating holes 34 can be selected to be as deep as possible in order to evade discrimination errors by the discrimination hole detection device 41.

If the lower half 5 is formed with recording capacity discriminating holes of a true circular or elliptical shape, as shown in FIG. 14, the diameter d and the pitch p1 are preferably set so as to be not less than 2.5 mm and not less than (d+0.5) mm, respectively, for enabling discrimination of the opening/closure pattern of the recording capacity discriminating holes 34. By setting d=3.5 mm and p1=4.5 mm, the three recording capacity discriminating holes 34 can be arrayed in succession thus sufficiently enabling these holes 34 to be discriminated by the tactile sense of the finger ends.

If the recording capacity discriminating holes 34 are elliptically shaped, the width thereof in a direction parallel to the width of the lower half 5 is the above-mentioned diameter d.

FIG. 15 shows a disc cartridge 51 of the second embodiment of the present invention. With the disc cartridge 51, recording capacity discriminating holes 35 of a square, rectangle or parallelepiped are formed in the lower half 55 making up the main cartridge body member 3, as shown in FIG. 15. For enabling the opening/closure pattern to be discriminated by the tactile sense of the finger end of the user, the width w1 and the pitch p2 of the recording capacity discriminating holes 35 are selected to be not less than 2.5 mm and not less than (w1+1.0) mm, respectively.

By setting w1=3.5 mm and p2=5.0 mm, the three recording capacity discriminating holes 35 can be arrayed in succession thus sufficiently enabling these holes 35 to be discriminated by the tactile sense of the finger ends.

FIG. 16 shows a disc cartridge 52 according to a third embodiment of the present invention. This disc cartridge 52 has a main cartridge body member 3 having a lower half 56 which is formed with plural recording capacity discriminating holes 36 of substantially arcuate grooves opened on the back side. For enabling discrimination of the opening/ closure patterns based on the tactile sense of the finger ends of the user, these recording capacity discriminating holes 36 are set to a width w2 of not less than 2.5 mm, a depth D parallel to the cartridge inserting direction of not less than 3.0 mm and to a pitch p3 of not less than (w2+1.0) mm.

By setting w2=3.5 mm, D=3.5 mm and p3=5.0 mm, the three recording capacity discriminating holes 36 can be arrayed in succession thus sufficiently enabling these holes 36 to be discriminated by the tactile sense of the finger ends.

These three recording capacity discriminating holes 34, 35 and 36, formed in the lower halves 5, 55 and 56 of the disc cartridges 1, 51 and 52, respectively, can be arrayed on a sole straight line L parallel to the back sides of the lower halves 5, 55 and 56 of the disc cartridges 1, 51 and 52.

Figure 17:
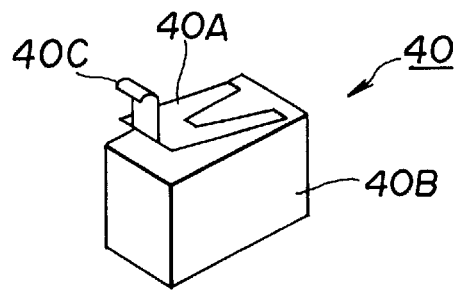
FIG. 17 is a perspective view showing a discrimination hole detection device used for discriminating the recording capacity discrimination hole f the disc cartridge of each of the above embodiments.
Figure 18:
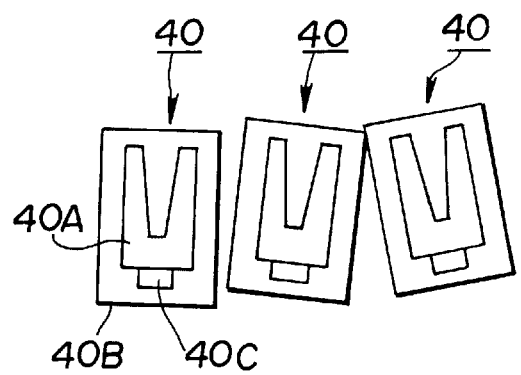
FIG. 18 is a plan view for illustrating the discrimination hole detection device.

Referring to FIG. 17, discrimination hole detection devices 40, provided on the recording/reproducing apparatus for discriminating the disc cartridges 1, 51 and 52, are explained. This discrimination hole detection devices 40 include a detection unit 40A passed through one of the recording capacity discriminating holes 34, 35 and 36 and a base portion 40B for rotatably supporting the proximal portion of the detection unit 40A. The detection unit 40A is substantially rectangular in shape and has a foremost part bent to form a detection piece 40C inserted into the recording capacity discriminating holes 34, 35 and 36. The base portion 40B is connected to a detection circuit, not shown, and issues a detection signal to a detection circuit, not shown, responsive to the displacement of the detection unit 40A inserted into the recording capacity discriminating holes 34, 35 and 36. The recording/reproducing apparatus can discriminate the recording capacity discriminating holes 34, 35 and 36 based on this detection signal.

The discrimination hole detection devices 40 need to be mounted with the relative disposition, such as orientation, correctly adjusted with respect to the recording capacity discriminating holes 34, 35 and 36. Thus, the discrimination hole detection devices 40 are provided at different positions on the straight line L extending parallel to an edge of the back surface of the main cartridge body member 3.

Figure 19:
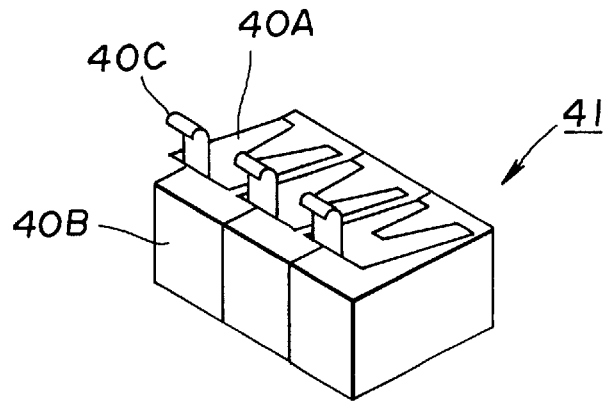
FIG. 19 is a perspective view showing a discrimination hole detection device used for discriminating the recording capacity discrimination hole of the disc cartridge of each of the above embodiments.
Figure 20:
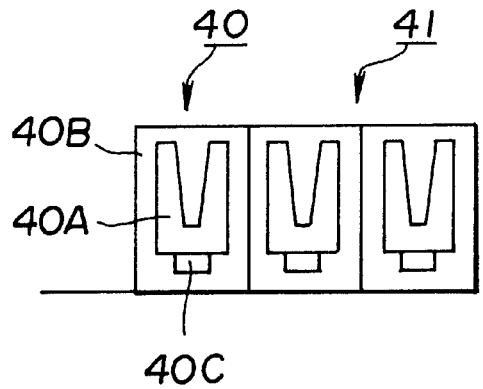
FIG. 20 is a plan view for illustrating the discrimination hole detection device.

In the disc cartridges 1, 51, 52, the recording capacity discriminating holes 34, 35 and 36 are formed on the straight lines L extending parallel to the back surfaces of the lower halves 5, 55, 56, respectively. Thus, with the disc cartridge 1, a discrimination hole detection assembly 41 can be used which consists in a unitary structure made up of plural discrimination hole detection devices 40 in meeting with the number of the recording capacity discriminating holes 34, 35 and 36 and the pitch, as shown in FIG. 19, thus making it unnecessary to adjust the orientation, for example, of the discrimination hole detection devices 40.

Thus, with the above-described disc cartridges 1, 51, 52, high-precision positioning of the discrimination hole detection assembly 41 relative to the recording capacity discriminating holes 34, 35 and 36 can be realized easily by using the straight line L extending parallel to the back surface of the lower half 5 as a reference.

The combination of the opening/closure patterns derived from the presence or absence of the recording capacity discriminating holes formed in the lower half 5 of the disc cartridge 1 of the above-described first embodiment and the state of discriminating the opening/closure patterns are explained by referring to the drawings and tables.

First, it is assumed that first to third recording capacity discrimination holes 34A to 34C and fourth to sixth recording capacity discrimination holes 34D to 34F are formed in the lower halves 5 and 57, respectively, in line symmetry to a straight line passing through the center of the center hub 14 and extending parallel to the cartridge loading direction. For illustration of such case, reference is had to FIGS. 21 and 22 and Tables 1 and 2.

Figure 21:
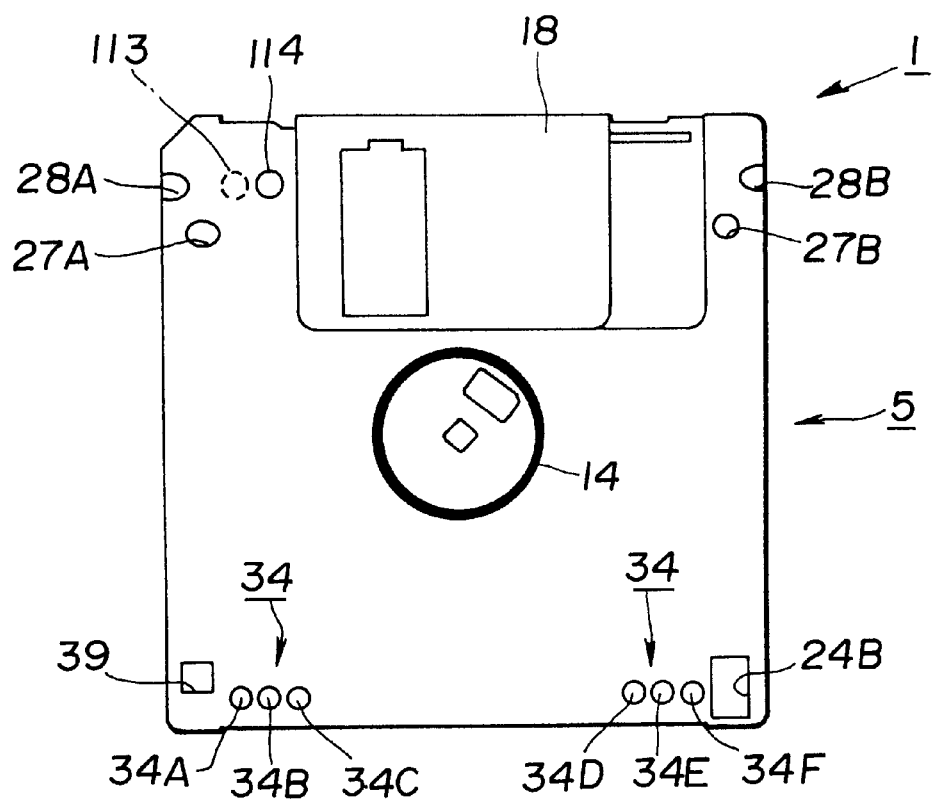
FIG. 21 is a plan view showing an example of a recording capacity discrimination hole formed in the first embodiment of the disc cartridge.

If recording capacity discrimination holes 113, 114 for discriminating a disc cartridge housing a disc with a recording capacity of 13 MB therein from a disc cartridge housing a disc with a recording capacity of 21 MB therein are formed in the lower half 5 of the disc cartridge 1, as shown in FIG. 21, and if these recording capacity discrimination holes 113, 114 are opened, the disc cartridge can be identified by visual inspection or by the discrimination hole detection assembly 41 to be a disc cartridge housing therein a disc with a recording capacity of not less than 21 MB.

The recording capacity of the disc cartridge 1 or design parameters, such as disc sorts, of the magnetic disc 2 housed within the main cartridge body member 3, can be discriminated by the discrimination hole detection assembly 41 or on visual check based on the six opening/closure patterns of the first to sixth recording capacity discrimination holes 34A to 34F.

Since these six recording capacity discrimination holes 34A to 34F may be open or closed, $2^6=64$ opening/closure patterns can be set for the disc cartridge 1, as shown in FIG. 21 and Table 1.

TABLE 1

| disc cartridge # | recording capacity discrimination holes | | | | | |
|---|---|---|---|---|---|---|
| | first | second | third | fourth | fifth | sixth |
| #1 | ● | ● | ● | ● | ● | ● |
| #2 | ○ | ● | ● | ● | ● | ● |
| #3 | ● | ○ | ● | ● | ● | ● |
| #4 | ○ | ○ | ● | ● | ● | ● |
| #5 | ● | ● | ○ | ● | ● | ● |
| #6 | ○ | ● | ○ | ● | ● | ● |
| #7 | ● | ○ | ○ | ● | ● | ● |
| #8 | ○ | ○ | ○ | ● | ● | ● |
| #9 | ● | ● | ● | ○ | ● | ● |
| . | | | | | | |
| #60 | ○ | ○ | ● | ○ | ○ | ○ |
| #61 | ● | ● | ○ | ○ | ○ | ○ |
| #62 | ○ | ● | ○ | ○ | ○ | ○ |
| #63 | ● | ○ | ○ | ○ | ○ | ○ |
| #64 | ○ | ○ | ○ | ○ | ○ | ○ |

● and ○ denote hole absent and hole present, respectively.

Specifically, the opening/closure pattern discriminates the state of all of the first to sixth recording capacity discrimination holes 34A to 34F being closed as being proper to the #1 disc cartridge. Also, the opening/closure pattern discriminates a disc cartridge having only the first discrimination hole 34A being opened as being the #2 disc cartridge, while discriminating a disc cartridge having only the second discrimination hole 34B being opened as being the #3 disc cartridge, and so forth so that #4 to #64 disc cartridges are set according to the recording capacities for discriminating 64 disc cartridges having different recording capacities.

Figure 22:
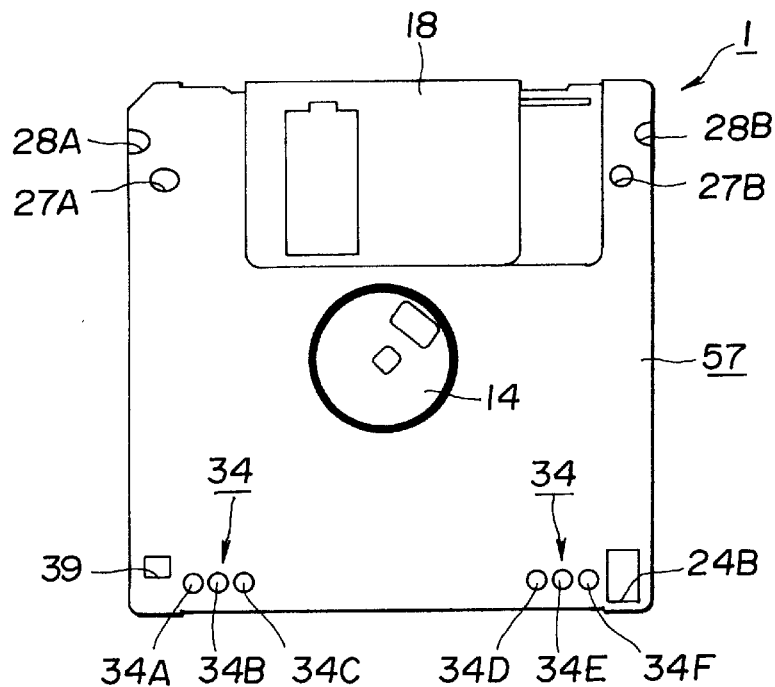
FIG. 22 is a plan view showing an example of a recording capacity discrimination hole formed in the first embodiment of the disc cartridge.

Alternatively, if the lower half 57 of the disc cartridge 1 is not formed with the recording capacity discriminating holes 113, 114 for discriminating the disc cartridge housing therein a disc with a recording capacity of 13 MB from the disc cartridge housing therein a disc with a recording capacity of 21 MB, as shown in FIG. 22, the first recording capacity discriminating hole 34A is used for discriminating the recording capacity of 13 MB from that of 21 MB. Therefore, if the disc cartridge 1 is formed with the first recording capacity discriminating hole 34A, it can be identified as a disc cartridge housing therein a disc with a recording capacity of 21 MB or more by the discrimination hole detection assembly 41 of the recording/reproducing apparatus or on visual check.

Moreover, the recording capacity or design parameters, such as disc sorts, of the magnetic disc housed within the main cartridge body member 3, can be identified from the five opening/closure patterns of the second to sixth recording capacity discrimination holes 34B to 34F, by the discrimination hole detection assembly 41 of the recording/reproducing apparatus or on visual check. Since the five recording capacity discrimination holes 34B to 34F may be open or closed, $2^5=32$ opening/closure patterns can be set for the disc cartridge 1, as shown in FIG. 22 and in Table 2.

TABLE 2

| disc cartridge # | recording capacity discrimination holes | | | | | |
|---|---|---|---|---|---|---|
| | first | second | third | fourth | fifth | sixth |
| #1 | ○ | ● | ● | ● | ● | ● |
| #2 | ○ | ○ | ● | ● | ● | ● |
| #3 | ○ | ● | ○ | ● | ● | ● |
| #4 | ○ | ○ | ○ | ● | ● | ● |
| #5 | ○ | ● | ● | ○ | ● | ● |
| #6 | ○ | ○ | ● | ○ | ● | ● |
| #7 | ○ | ● | ○ | ○ | ● | ● |
| #8 | ○ | ○ | ○ | ○ | ● | ● |
| #9 | ○ | ● | ● | ● | ○ | ● |
| . | | | | | | |
| #28 | ○ | ○ | ○ | ● | ○ | ○ |
| #29 | ○ | ● | ● | ○ | ○ | ○ |
| #30 | ○ | ○ | ● | ○ | ○ | ○ |
| #31 | ○ | ● | ○ | ○ | ○ | ○ |
| #32 | ○ | ○ | ○ | ○ | ○ | ○ |

● and ○ denote hole absent and hole present, respectively.

Specifically, this opening/closure pattern discriminates the state of only the first recording capacity discrimination hole 34A being opened as being proper to the #1 disc cartridge. Also, with the opening/closure pattern, it becomes possible to discriminate 32 disc cartridges having different recording capacities by setting the #2 disc cartridge up to #32 disc cartridge according to the disc capacities.

Then, it is assumed that first and second recording capacity discrimination holes 37A and 37B and third and fourth recording capacity discrimination holes 37C and 37D are formed in the lower halves 58 and 59, respectively, in line symmetry to a straight line passing through the center of the center hub 14 and extending parallel to the cartridge loading direction. For illustration of such case, reference is had to FIGS. 23 and 24 and Tables 3 and 4.

Figure 23:
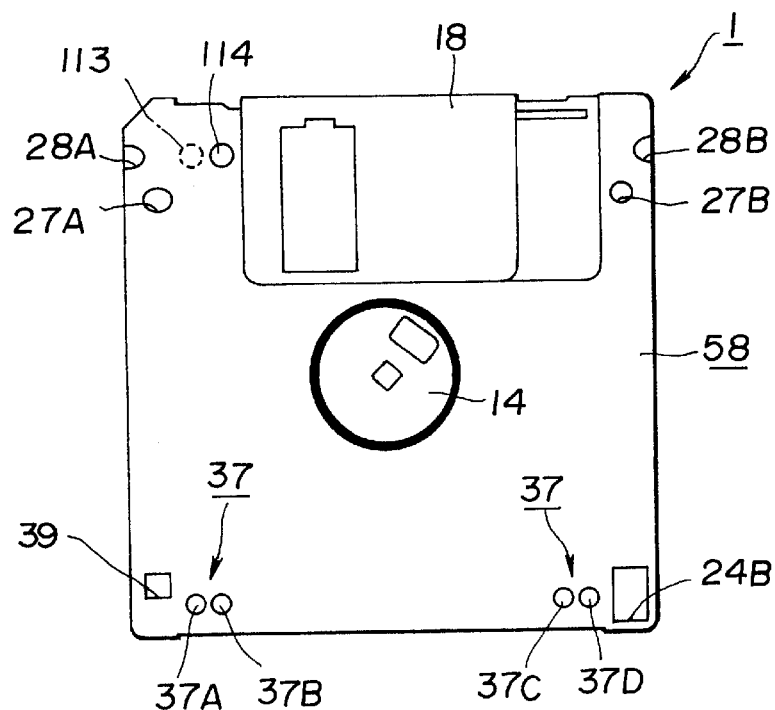
FIG. 23 is a plan view showing an example of a recording capacity discrimination hole formed in the first embodiment of the disc cartridge.

If recording capacity discrimination holes 113, 114 for discriminating a disc cartridge housing a disc with a recording capacity of 13 MB therein from a disc cartridge housing a disc with a recording capacity of 21 MB therein are formed in the lower half 58 of the disc cartridge 1, as shown in FIG. 23, and if these recording capacity discrimination holes 113, 114 are opened, the disc cartridge can be identified by visual inspection or by the discrimination hole detection assembly 41 to be a disc cartridge housing therein a disc with a recording capacity of not less than 21 MB.

The recording capacity of the disc cartridge 1 or design parameters, such as disc sorts, of the magnetic disc 2 housed within the main cartridge body member 3 can be discriminated by the discrimination hole detection assembly 41 or on visual check based on the four opening/closure patterns of the first to fourth recording capacity discrimination holes 37A to 37D.

Since these four recording capacity discrimination holes 37A to 37D may be open or closed, $2^4=16$ opening/closure patterns can be set for the disc cartridge 1, as shown in FIG. 23 and Table 3.

TABLE 3

| disc cartridge # | disc capacity discrimination holes | | | |
|---|---|---|---|---|
| | first | second | third | fourth |
| #1 | ● | ● | ● | ● |
| #2 | ○ | ● | ● | ● |
| #3 | ● | ○ | ● | ● |
| #4 | ○ | ○ | ● | ● |
| #5 | ● | ● | ○ | ● |
| #6 | ○ | ● | ○ | ● |
| #7 | ● | ○ | ○ | ● |
| #8 | ○ | ○ | ○ | ● |
| #9 | ● | ● | ● | ○ |
| #10 | ○ | ● | ● | ○ |
| #11 | ● | ○ | ● | ○ |
| #12 | ○ | ○ | ● | ○ |
| #13 | ● | ● | ○ | ○ |
| #14 | ○ | ● | ○ | ○ |
| #15 | ● | ○ | ○ | ○ |
| #16 | ○ | ○ | ○ | ○ |

● and ○ denote hole absent and hole present, respectively.

Specifically, this opening/closure pattern discriminates the state of all of the first to fourth recording capacity discrimination holes 37A to 37D being closed as being proper to the #1 disc cartridge. Also, the opening/closure pattern discriminates a disc cartridge having only the first discrimination hole 37A being opened as being the #2 disc cartridge, while discriminating a disc cartridge having only the second discrimination hole 37B being opened as being the #3 disc cartridge, and so forth so that #4 to #16 disc cartridges are set according to the recording capacities for discriminating 16 disc cartridges having different recording capacities.

Alternatively, if the disc cartridge 1 is not formed with recording capacity discriminating holes 113, 114 for discriminating the disc cartridge housing therein a disc with a recording capacity of 13 MB from the disc cartridge housing therein a disc with a recording capacity of 21 MB, the first recording capacity discriminating hole 37A is used for discriminating the recording capacity of 13 MB from that of 21 MB. Therefore, if the disc cartridge 1 has the first recording capacity discriminating hole 37A opened, it can be identified as a disc cartridge housing therein a disc with a recording capacity of 21 MB or more by the discrimination hole detection assembly 41 of the recording/reproducing apparatus or on visual check.

Moreover, the recording capacity or design parameters, such as disc sorts, of the magnetic disc housed within the main cartridge body member 3, can be identified from the three opening/closure patterns of the second to fourth recording capacity discrimination holes 37B to 37D, by the discrimination hole detection assembly 41 of the recording/reproducing apparatus or on visual check.

Figure 24:
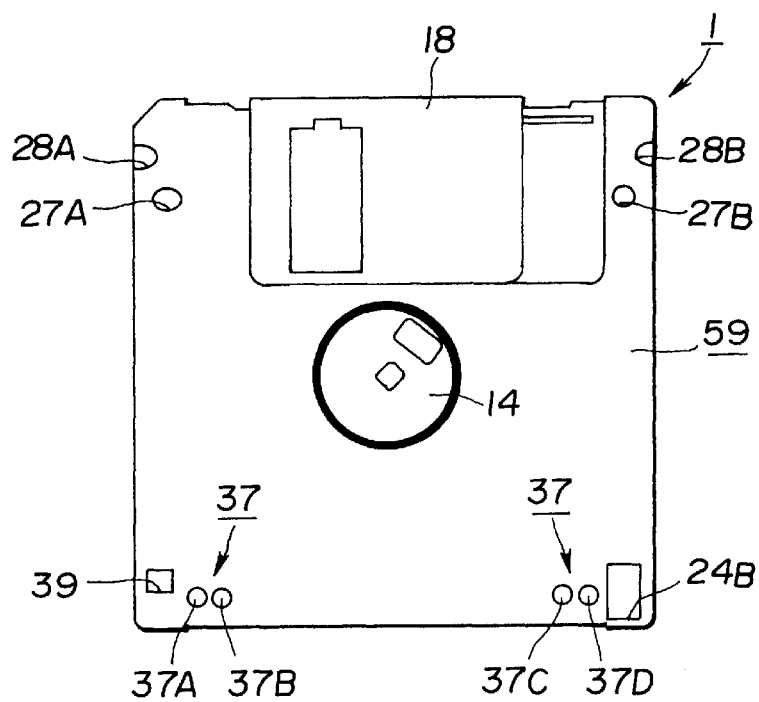
FIG. 24 is a plan view showing an example of a recording capacity discrimination hole formed in the first embodiment of the disc cartridge.

Since the three recording capacity discrimination holes 37B to 37D may be open or closed, $2^3=8$ opening/closure patterns can be set for the disc cartridge 1, as shown in FIG. 24 and in Table 4.

TABLE 4

| disc cartridges # | storage capacity discriminating holes | | | |
|---|---|---|---|---|
| | first | second | third | fourth |
| #1 | ○ | ● | ● | ● |
| #2 | ○ | ○ | ● | ● |
| #3 | ○ | ● | ○ | ● |
| #4 | ○ | ○ | ○ | ● |
| #5 | ○ | ● | ● | ○ |
| #6 | ○ | ○ | ● | ○ |
| #7 | ○ | ● | ○ | ○ |
| #8 | ○ | ○ | ○ | ○ |

● and ○ denote hole absent and hole present, respectively.

Specifically, this opening/closure pattern discriminates the state of only the first recording capacity discriminating hole 37A being opened as being proper to the #1 disc cartridge. This opening/closure pattern can discriminate eight disc cartridges #2 to #8 of different recording capacities by setting the disc cartridges according to the recording capacities.

Then, it is assumed that first and second recording capacity discrimination holes 38A and 38B are formed in the lower halves 60 and 61, respectively, in line symmetry to a straight line passing through the center of the center hub 14 and extending parallel to the cartridge loading direction. For illustration of such case, reference is had to FIGS. 25 and 26 and Tables 5 and 6.

Figure 25:
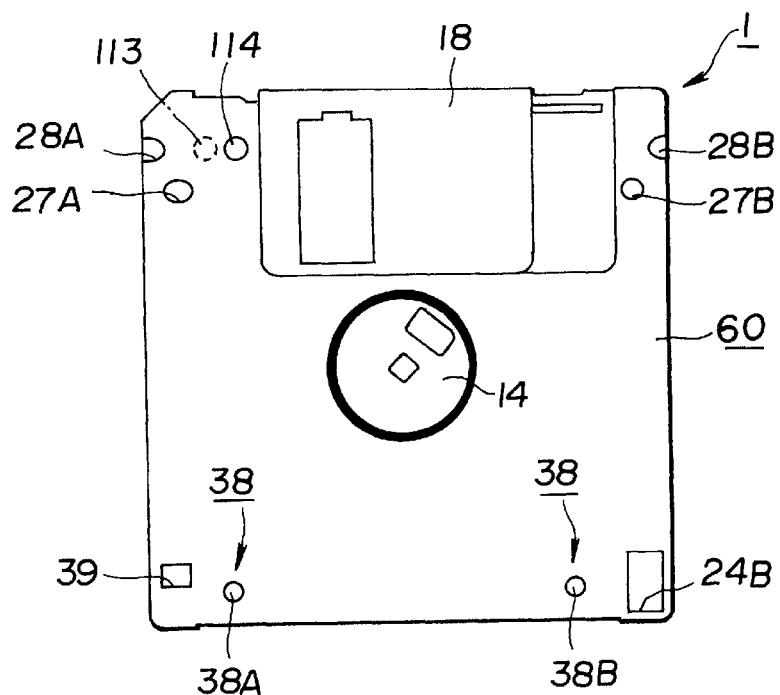
FIG. 25 is a plan view showing an example of a recording capacity discrimination hole formed in the first embodiment of the disc cartridge.

If recording capacity discrimination holes 113, 114 for discriminating a disc cartridge housing a disc with a recording capacity of 13 MB therein from disc cartridge housing a disc with a recording capacity of 21 MB therein are formed in the lower half 58 of the disc cartridge 1, as shown in FIG. 25, and if these recording capacity discrimination holes 113, 114 are opened, the disc cartridge can be identified by visual inspection or by the discrimination hole detection assembly 41 to be a disc cartridge housing therein a disc with a recording capacity of not less than 21 MB.

The recording capacity of the disc cartridge 1 or design parameters, such as disc sorts, of the magnetic disc 2 housed within the main cartridge body member 3 can be discriminated by the discrimination hole detection assembly 41 or on visual check based on the two opening/closure patterns of the first and second recording capacity discrimination holes 38A and 38B. Since these two recording capacity discrimination holes 38A and 38B may be open or closed, $2^2=4$ opening/closure patterns can be set for the disc cartridge 1, as shown in FIG. 25 and Table 5.

TABLE 5

| disc cartridges # | storage capacity discriminating holes | |
|---|---|---|
| | first | second |
| #1 | ● | ● |
| #2 | ○ | ● |
| #3 | ● | ○ |
| #4 | ○ | ○ |

● and ○ denote hole absent and hole present, respectively.

Specifically, this opening/closure pattern discriminates the state of both the first and second recording capacity discrimination holes 38A and 38B being closed as being proper to the #1 disc cartridge. Also, the opening/closure pattern discriminates a disc cartridge having only the first discrimination hole 38A being opened as being the #2 disc cartridge, while discriminating a disc cartridge having only the second discrimination hole 38B being opened as being the #3 disc cartridge, and a disc cartridge having both the first and second recording capacity discrimination holes 38A and 38B being opened as being the #4 disc cartridge, so that it becomes possible to discriminate four disc cartridges according to the different recording capacities by pre-setting the patterns according to different recording capacities.

Alternatively, if the disc cartridge 1 is not formed with recording capacity discriminating holes 113, 114 for discriminating the disc cartridge housing therein a disc with a recording capacity of 13 MB from the disc cartridge housing therein a disc with a recording capacity of 21 MB, the first recording capacity discriminating hole 38A is used for discriminating the recording capacity of 13 MB from that of 21 MB. Therefore, if the disc cartridge 1 has the first recording capacity discriminating hole 38A opened, it can be identified as a disc cartridge housing therein a disc with a recording capacity of 21 MB or more by the discrimination hole detection assembly 41 of the recording/reproducing apparatus or on visual check.

Figure 26:
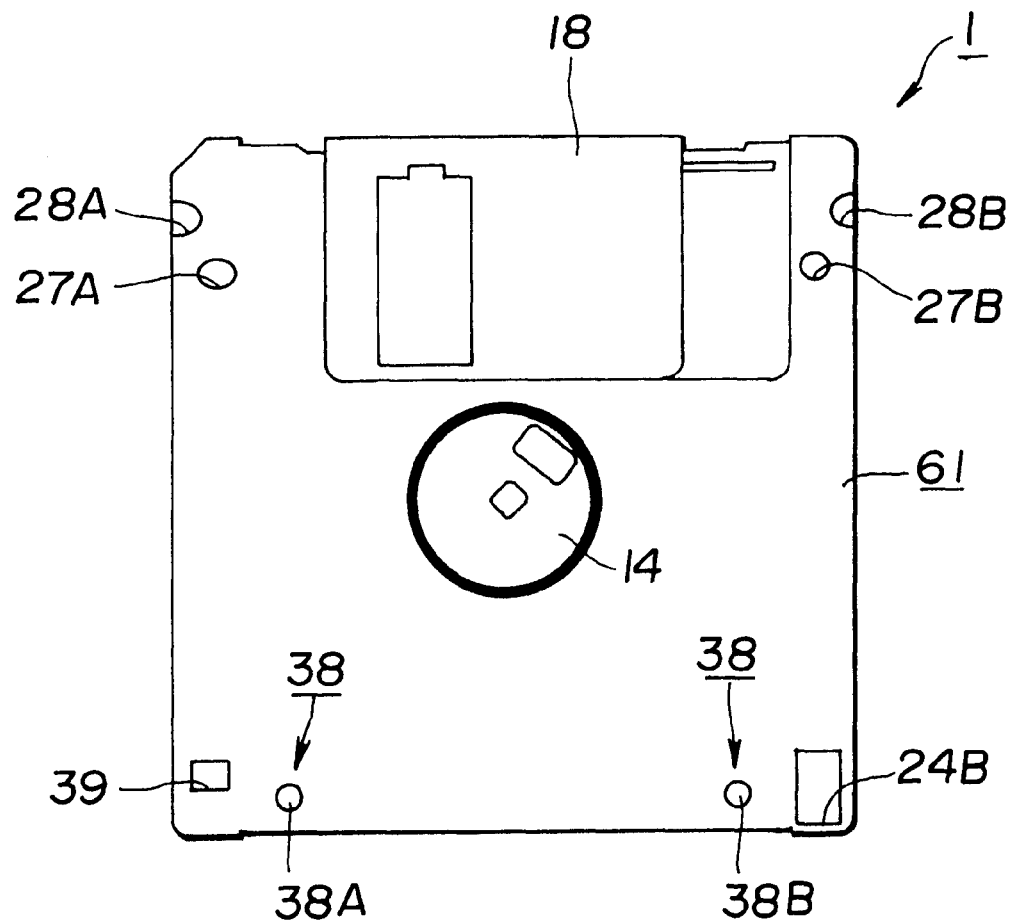
FIG. 26 is a plan view showing an example of a recording capacity discrimination hole formed in the first embodiment of the disc cartridge.
Figure 27:
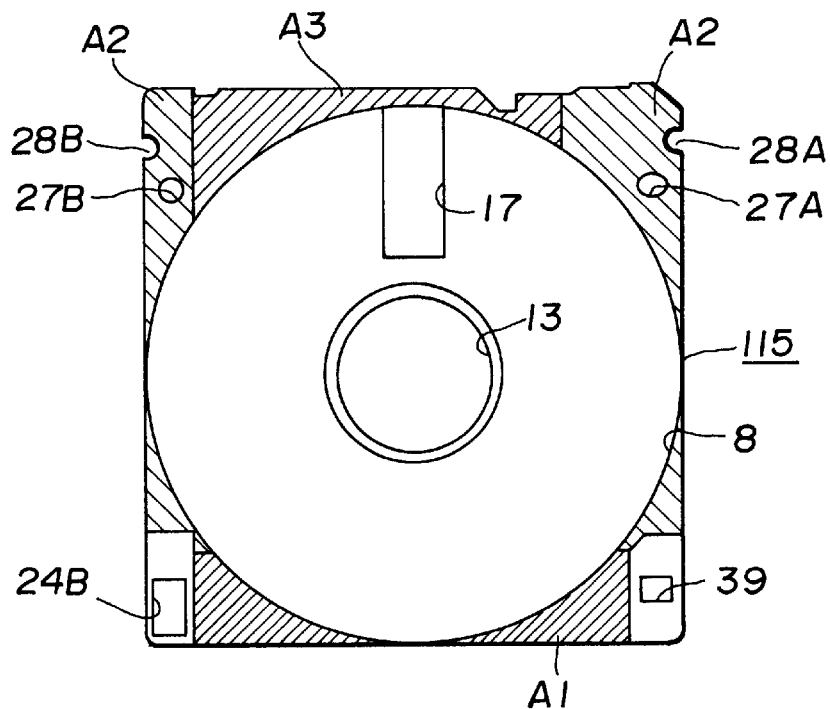
FIG. 27 is a plan view showing an inner portion of a lower cartridge half constituting a fourth embodiment of a disc cartridge according to the present invention.
Figure 28:
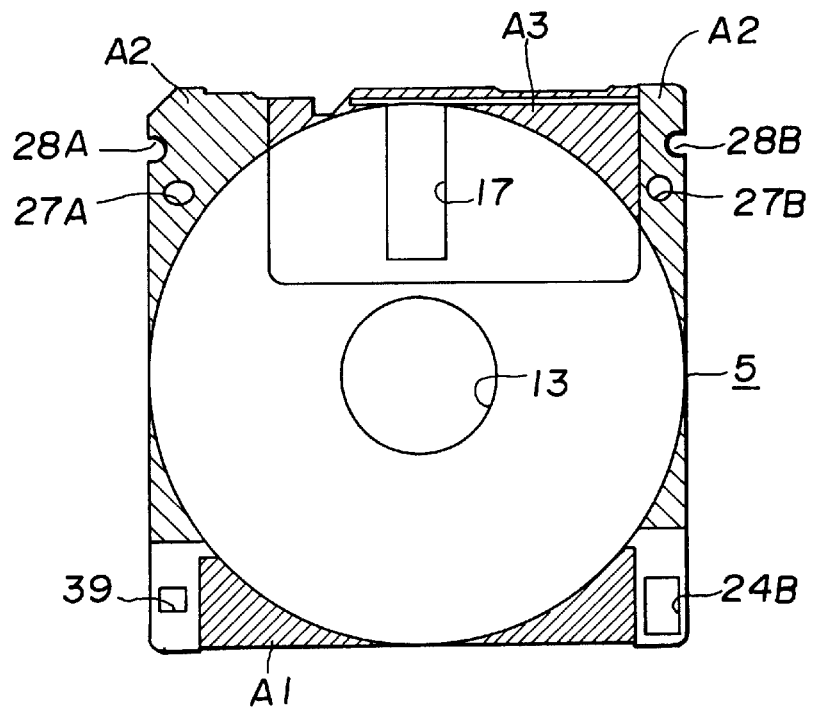
FIG. 28 is a plan view showing an outer side of a lower half constituting the disc cartridge of FIG. 27.
Figure 29:
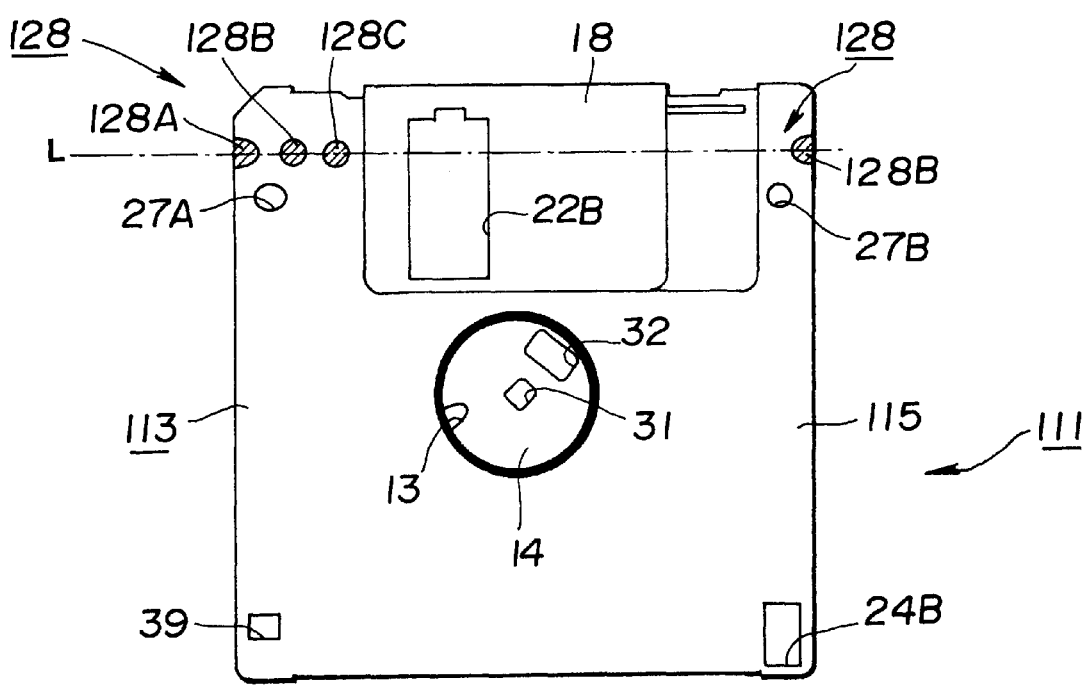
FIG. 29 is a bottom view showing the lower half of the disc cartridge of FIG. 27.

Moreover, the recording capacity or design parameters, such as disc sorts, of the magnetic disc housed within the main cartridge body member 3, can be identified from the sole opening/closure patterns of the second recording capacity discrimination hole 38B, by the discrimination hole detection assembly 41 of the recording/reproducing apparatus or on visual check. Since the second recording capacity discrimination hole 38B may be open or closed, two opening/closure patterns, denoted by the presence or absence of the hole, can be set by the second recording capacity discrimination hole 38B, as shown in FIG. 26 and in Table 6.

TABLE 6

| disc cartridge # | storage capacity discriminating holes | |
|---|---|---|
| | first | second |
| #1 | ○ | ● |
| #2 | ○ | ○ |

● and ○ denote hole absent and hole present, respectively.

Specifically, this opening/closure pattern discriminates a disc cartridge having only the first recording capacity discriminating hole 38A opened as a #1 disc cartridge, while discriminating a disc cartridge having both the first and second recording capacity discriminating holes 38A and 38B opened as a #2 disc cartridge by pre-setting the patterns according to the recording capacities for enabling discrimination of two disc cartridges having different recording capacities.

Moreover, the lower half 5 and the upper half 4 of the disc cartridge 1, having the recording capacity discriminating holes and constituting the bottom of the recording capacity discriminating holes, respectively, are formed of resin materials having different colors. Specifically, the upper half 4 and the lower half 5 of the main cartridge body member 3, are colored in white and black, respectively.

Thus, with the present main cartridge body member 3, the upper half 4 of the different color can be easily visually distinguished via the recording capacity discriminating hole 34 formed in the lower half 5 when reading out the opening/closure pattern of the recording capacity discriminating holes 34 formed in the lower half 5 by visual check, so that the opening/closure pattern of the recording capacity discriminating holes can be identified clearly based on the difference in color.

Although the upper and lower halves 4, 5 are of distinct colors, difference in appearance, such as difference in colors including transparency, color saturation, brightness, concentration, patterns or combinations thereof, is also possible.

Only an area of the upper half 4 in register with the recording capacity discriminating holes 34 of the lower half 5 may be molded of resin materials having different colors, such as colors or color concentration, by two-color molding. Alternatively, only an area of the upper half 4 in register with the recording capacity discriminating holes 34 of the lower half may be fitted with another material different in color or in color concentration.

The main cartridge body member 3 may also be easily and reliably distinguished by color inspection by suitably setting the colors, color concentration or combinations of the upper half 4 and the lower half 5 only for an area of the upper half 4 in register with the recording capacity discriminating holes 34 of the lower half 5.

The above-described disc cartridge 1 has the recording capacity discriminating holes 34 on a straight line L extending parallel to the back surface of the lower half 5, thus enabling distinction from other disc cartridges of different recording capacities. Moreover, since the recording capacity discriminating holes 34 are formed neighboring to the mistaken erasure inhibiting member 24A, the recording capacity discriminating holes 34 may be arranged in combination with detection means configured for detecting the mistaken erasure inhibiting member 24A and the discrimination hole detection assembly 41.

Although the design parameter discriminating hole is applied in the disc cartridge 1 of the first embodiment as the recording capacity discriminating holes, the design parameter discriminating hole may also be applied for discriminating different design parameters of recording and/or reproducing means.

A fourth embodiment of the disc cartridge 111 according to the present invention is now explained.

The parts or components common to those of the above-described first embodiment are depicted by the same numerals and are not explained for avoiding redundancy.

In the lower half 115 of the disc cartridge 111, recording capacity discrimination holes for discriminating the recording capacities of the magnetic disc 2 can be formed on a major surface thereof excluding an area in register with the disc housing section 8, more specifically, in the first setting area A1 towards the back side, second setting areas A2 on both sides parallel to the cartridge loading direction and in the third setting area A3 on the cartridge loading side. Of course, the recording capacity discrimination holes 128 may also be elliptical or rectangular instead of being circular in profile.

The lower half of the conventional disc cartridge is formed with engagement recesses of a semi-circular cross-section on both lateral sides along the cartridge loading direction. When the disc cartridge 1 is inserted into a recording and/or reproducing apparatus having an automatic loading unit or an automatic cartridge exchange unit, these engagement recesses are engaged by a cartridge movement operating unit provided on the automatic loading unit or the automatic cartridge exchange unit.

Specifically, for distinction from the conventional disc cartridge, at least one of the first recording capacity discrimination holes 128A or the second recording capacity discrimination holes 128B need to be formed flush with the lateral surface or the major surface of the main cartridge body member 113 or formed as through-holes along the direction of thickness.

Thus, in the present disc cartridge 111, there are three states of the opening/closure pattern of the first recording capacity discrimination holes 128A and the second recording capacity discrimination holes 128B, that is a state in which one of the discrimination holes 128A and 128B is closed, and both the discrimination holes 128A and 128B are closed.

In the present disc cartridge 111, since the third and fourth recording capacity discrimination holes 128C, 128D may be open or closed, $2^2=4$ opening/closure patterns can be set, so that, with the present disc cartridge 111, 3×4=12 opening/closure patterns can be set, as shown in Table 7.

TABLE 7

| disc cartridges # | recording capacity discriminating holes | | | |
|---|---|---|---|---|
| | first | second | third | fourth |
| #1 | ● | ● | ● | ● |
| #2 | ● | ● | ● | ○ |
| #3 | ● | ● | ○ | ● |
| #4 | ● | ● | ○ | ○ |
| #5 | ● | ○ | ● | ● |
| #6 | ● | ○ | ● | ○ |
| #7 | ● | ○ | ○ | ● |
| #8 | ● | ○ | ○ | ○ |
| #9 | ○ | ● | ● | ● |
| #10 | ○ | ● | ● | ○ |
| #11 | ○ | ● | ○ | ● |
| #12 | ○ | ● | ○ | ○ |

● and ○ denote hole absent and hole present, respectively.

Thus, with this opening/closure pattern, 12 disc cartridges from #1 to #12 having different recording capacities can be discriminated by pre-setting the patterns for the different recording capacities for the #1 disc cartridge up to #12 disc cartridge.

Figure 30:
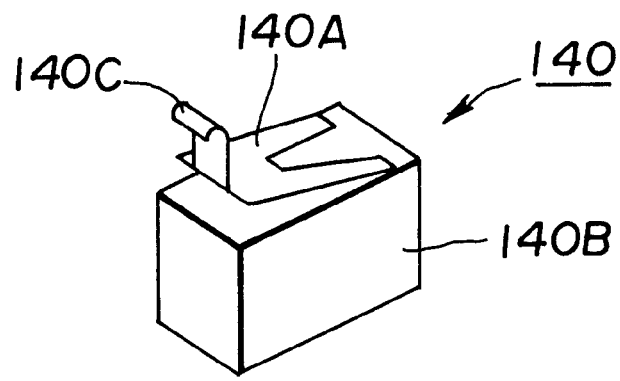
FIG. 30 is a perspective view showing a discrimination hole detection device used for discriminating the recording capacity discrimination hole formed in the disc cartridge.

Referring to FIG. 30, a discrimination hole detection device 140 provided on the recording/reproducing apparatus for detecting the recording capacity discrimination holes 128 is explained. The discrimination hole detection device 140 has a detecting unit 140A inserted into the recording capacity discrimination holes 128 and a base unit 140B for rotatably supporting the base portion of the detecting unit 140A. The detecting unit 140A is substantially rectangular in profile and has a distal end portion bent to form a detection piece 140C inserted into the recording capacity discrimination holes 128. The base unit 140B is connected to a detection circuit, not shown, and outputs a detection signal to a detection circuit, not shown, responsive to the amount of displacement of the detection unit 140A rotated as a result of insertion of the detection unit into the recording capacity discrimination holes 128. The recording/reproducing apparatus is responsive to this detection signal to discriminate the opening/closure pattern of the recording capacity discrimination holes 128. The discrimination hole detection device 140 needs to be arranged with high-precision adjustment of the relative position, such as orientation, with respect to the recording capacity discrimination hole 128.

In the disc cartridge 111 of the instant embodiment, the recording capacity discrimination holes 128 are arranged on a straight line L extending parallel to the back surface of the lower half 115. Thus it becomes possible with the disc cartridge 111 to use a discrimination hole detection assembly 141 made up of plural discrimination hole detection devices 140 in meeting with the number and the pitch of the recording capacity discrimination holes 128, thus making it unnecessary to adjust the position, such as the orientation, of the discrimination hole detection devices 140.

Figure 31:
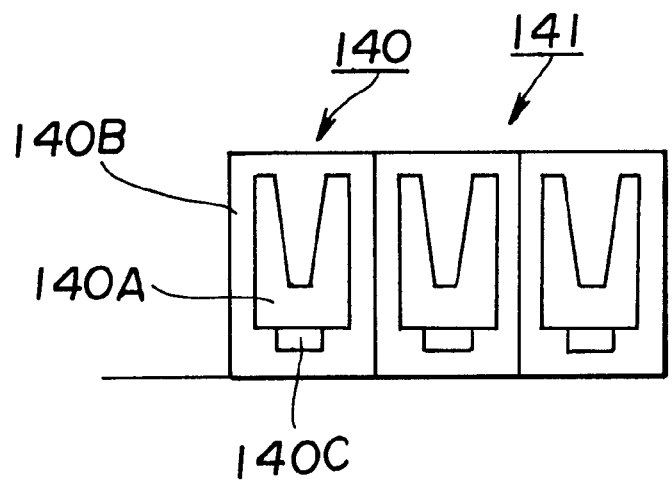
FIG. 31 is a plan view for illustrating the discrimination hole detection device.

Thus, with the present disc cartridge 111, the discrimination hole detection assembly 141 can be positioned highly accurately with respect to the recording, capacity discrimination holes 128 by employing the straight line L parallel to the back surface of the lower half 115 as shown in FIG. 31.

The state in which the recording and/or reproducing apparatus discriminates the disc cartridge 111 from other disc cartridges of different recording capacities by the first to fourth recording capacity discrimination holes 128A to 128D is hereinafter explained.

First, the disc cartridge 111 has the first and second recording capacity discrimination holes 128A and 128B detected by the discrimination hole detection assembly 141 of the recording and/or reproducing apparatus, so that it is identified to be a cartridge housing therein a so-called large-capacity disc different in recording capacity from the above-mentioned disc cartridges 101 to 105.

The disc cartridge 111 of the fourth embodiment is then identified, by the opening/closure patterns of the third and fourth recording capacity discriminating holes 128C, 128D, to be a disc cartridge housing therein a disc of different recording capacity among the disc cartridges housing therein discs of different recording capacities.

The disc cartridge 111 of the fourth embodiment is configured so that the first and second recording capacity discriminating holes 128A, 128B formed in the lower half 115 are cut out from the outer periphery of the lower half 115 so as to be in register with the engagement recesses formed in the lateral sides of the main cartridge body member 113. Alternatively, the recording capacity discriminating holes may also be formed in the major surface of the lower half 155. A lower half 155 of the disc cartridge 151 of the fifth embodiment is explained with reference to FIG. 32. Since the structure of the present embodiment is substantially the same as that of the lower half 115, described above, the same members are denoted by the same reference numerals and the detailed explanation is not made for avoiding redundancy.

Figure 32:
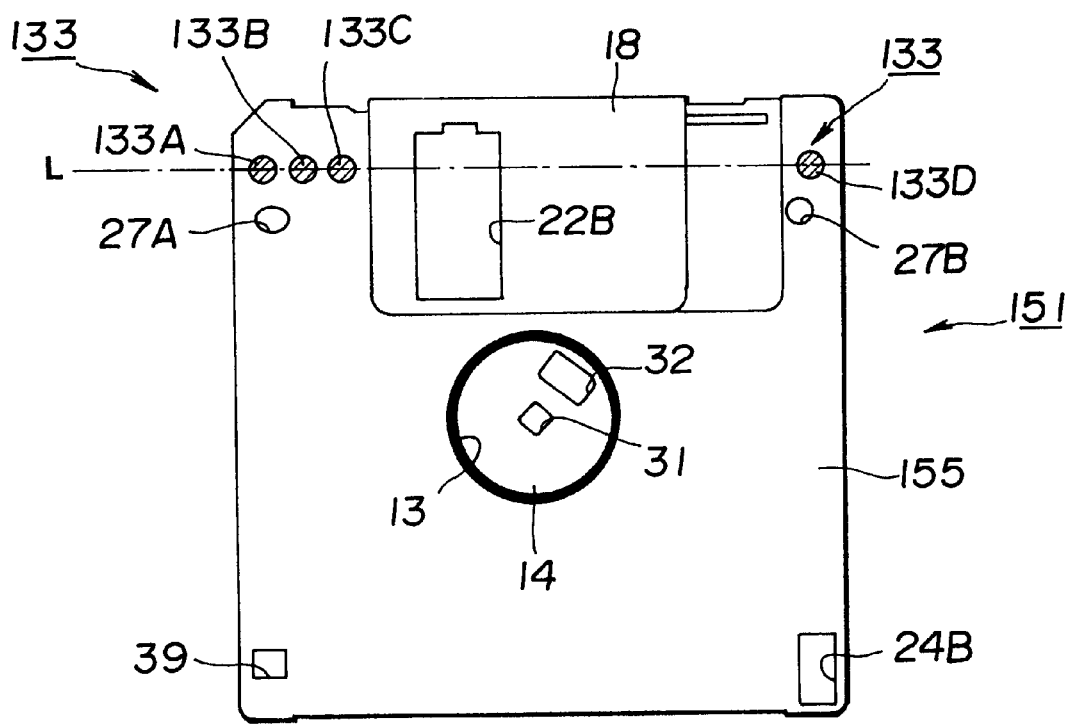
FIG. 32 is a bottom view showing a lower cartridge half of a disc cartridge according to a fourth embodiment of the present invention.

In the lower half 155, circular first to fourth recording capacity discrimination holes 133A to 133D are formed in the forward side of a straight line interconnecting the centers of the positioning holes 27A, 27B, as shown in FIG. 32. These first to fourth recording capacity discrimination holes 133A to 133D are formed on the straight line L lying at right angles to the cartridge inserting direction.

The disc cartridges 111, 151, having the respective halves 115, 155 formed with the recording capacity discrimination holes 128, 133, can be distinguished easily and reliably from other disc cartridges housing discs of different recording capacities.

In the above-described disc cartridges, the design parameter discrimination holes are used as recording capacity discrimination holes. However, the present invention is not limited to discrimination of the disc recording capacities but may be applied to discrimination of different design parameters of, for example, recording and/or reproducing means. The number of the recording capacity discrimination holes may be set as desired.

The present invention may be applied not only to disc cartridges housing therein the above-mentioned magnetic discs but also to a cartridge housing therein a disc used as an information recording medium such as an optical disc or a magneto-optical disc for recording information signals.

What is claimed is:

1. An apparatus including a disc cartridge comprising:
a main cartridge body member having,
   on a first surface, a label area for bonding a display label indicating the recording contents of information signals, said main cartridge body member having,
   on a second surface, a spindle hole for rotating the disc, and
   a plurality of design parameter discriminating holes extending along the back side opposite to the front side in the cartridge inserting direction, said design parameter discriminating holes formed proportionally in line symmetry with respect to the centerline of the main cartridge body member extending substantially parallel to the cartridge insertion direction, each of said design parameter discriminating holes configured to have first and second states, the combination of said design parameter discriminating hole states indicative of a predetermined disc design parameter; and
a detector for detecting said design parameter discrimination holes, said detector including:
   a detection unit having a bent foremost portion; and
   a base portion for rotatably supporting a proximal portion of said detection unit, configured to provide a detection signal responsive to the displacement of said bent foremost portion when said foremost portion is engaged with one of said plurality of discriminating holes.

2. The apparatus of claim 1 wherein said detection unit is substantially rectangular in shape.

3. The apparatus of claim 2 wherein the main cartridge body member has, next to said design parameter discriminating hole, a mistaken erasure inhibiting member for controlling recording of information signals on the disc.

4. The apparatus of claim 3 wherein said design parameter discriminating holes are formed on a straight line substantially perpendicular to the cartridge inserting direction.

5. The apparatus of claim 4 wherein said plurality of design parameter discriminating holes includes a recording capacity discriminating hole for discriminating the recording capacity of the information signals.

6. The apparatus of claim 5 wherein the main cartridge body member is made up of an upper half and a lower half, combined together, said upper half and the lower half being of different colors.

7. The apparatus of claim 6 wherein said predetermined design parameter includes one of the disc recording capacity, disc type, and disc format.

8. The apparatus of claim 7 wherein the displacement of said bent foremost portion of each of said plurality of discrimination hole determines between said first and second state for each discrimination hole.

9. The apparatus of claim 1 wherein the main cartridge body member has, next to said design parameter discriminating hole, a mistaken erasure inhibiting member for controlling recording of information signals on the disc.

10. The apparatus of claim 9 wherein said design parameter discriminating holes are formed on a straight line substantially perpendicular to the cartridge inserting direction.

11. The apparatus of claim 10 wherein said plurality of design parameter discriminating holes includes a recording capacity discriminating hole for discriminating the recording capacity of the information signals.

12. The apparatus of claim 11 wherein the main cartridge body member is made up of an upper half and a lower half, combined together, said upper half and the lower half being of different colors.

13. The apparatus of claim 12 wherein said predetermined design parameter includes one of the disc recording capacity, disc type, and disc format.

14. The apparatus of claim 13 wherein the displacement of said bent foremost portion of each of said plurality of discrimination hole determines between said first and second state for each discrimination hole.

15. The apparatus of claim 1 wherein said design parameter discriminating holes are formed on a straight line substantially perpendicular to the cartridge inserting direction.

16. The apparatus of claim 15 wherein said plurality of design parameter discriminating holes includes a recording capacity discriminating hole for discriminating the recording capacity of the information signals.

17. The apparatus of claim 16 wherein the main cartridge body member is made up of an upper half and a lower half, combined together, said upper half and the lower half being of different colors.

18. The apparatus of claim 17 wherein said predetermined design parameter includes one of the disc recording capacity, disc type, and disc format.

19. The apparatus of claim 18 wherein the displacement of said bent foremost portion of each of said plurality of discrimination hole determines between said first and second state for each discrimination hole.

20. The apparatus of claim 1 wherein said plurality of design parameter discriminating holes includes a recording capacity discriminating hole for discriminating the recording capacity of the information signals.

21. The apparatus of claim 20 wherein the main cartridge body member is made up of an upper half and a lower half, combined together, said upper half and the lower half being of different colors.

22. The apparatus of claim 21 wherein said predetermined design parameter includes one of the disc recording capacity, disc type, and disc format.

23. The apparatus of claim 22 wherein the displacement of said bent foremost portion of each of said plurality of discrimination hole determines between said first and second state for each discrimination hole.

24. The apparatus of claim 1 wherein the main cartridge body member is made up of an upper half and a lower half, combined together, said upper half and the lower half being of different colors.

25. The apparatus of claim 24 wherein said predetermined design parameter includes one of the disc recording capacity, disc type, and disc format.

26. The apparatus of claim 25 wherein the displacement of said bent foremost portion of each of said plurality of discrimination hole determines between said first and second state for each discrimination hole.

27. The apparatus of claim 1 wherein said predetermined design parameter includes one of the disc recording capacity, disc type, and disc format.

28. The apparatus of claim 27 wherein the displacement of said bent foremost portion of each of said plurality of discrimination hole determines between said first and second state for each discrimination hole.

29. The apparatus of claim 1 wherein the displacement of said bent foremost portion of each of said plurality of discrimination hole determines between said first and second state for each discrimination hole.

30. An apparatus including a disc cartridge comprising:
a main cartridge body member having,
 on a first surface, a label area for bonding a display label indicating the recording contents of information signals, said main cartridge body member having,
 on a second surface, a spindle hole for rotating the disc, and
 a plurality of design parameter discriminating holes extending along the back side opposite to the front side in the cartridge inserting direction, said design parameter discriminating holes formed proportionally in line symmetry with respect to the centerline of the main cartridge body member extending substantially parallel to the cartridge insertion direction, each of said design parameter discriminating holes configured to have first and second states, the combination of said design parameter discriminating hole states indicative of a predetermined disc design parameter; and
a detector for detecting said design parameter discrimination holes, said detector including:
 a detection unit having a bent foremost portion; and
 a base portion for rotatably supporting a proximal portion of said detection unit, configured to provide a detection signal responsive to the displacement of said bent foremost portion when said foremost portion is engaged with one of said plurality of discriminating holes;
  wherein the main cartridge body member has, next to said design parameter discriminating hole, a mistaken erasure inhibiting member for controlling recording of information signals on the disc.

31. The apparatus of claim 30 wherein said detection unit is substantially rectangular in shape.

32. The apparatus of claim 31 wherein the displacement of said bent foremost portion of each of said plurality of discrimination hole determines between said first and second state for each discrimination hole.

33. The apparatus of claim 32 wherein said design parameter discriminating holes are formed on a straight line substantially perpendicular to the cartridge inserting direction.

34. The apparatus of claim 33 wherein said plurality of design parameter discriminating holes includes a recording capacity discriminating hole for discriminating the recording capacity of the information signals.

35. The apparatus of claim 34 wherein the main cartridge body member is made up of an upper half and a lower half, combined together, said upper half and the lower half being of different colors.

36. The apparatus of claim 35 wherein said predetermined design parameter includes one of the disc recording capacity, disc type, and disc format.

37. The apparatus of claim 30 wherein the displacement of said bent foremost portion of each of said plurality of discrimination hole determines between said first and second state for each discrimination hole.

38. The apparatus of claim 37 wherein said design parameter discriminating holes are formed on a straight line substantially perpendicular to the cartridge inserting direction.

39. The apparatus of claim 38 wherein said plurality of design parameter discriminating holes includes a recording capacity discriminating hole for discriminating the recording capacity of the information signals.

40. The apparatus of claim 39 wherein the main cartridge body member is made up of an upper half and a lower half, combined together, said upper half and the lower half being of different colors.

41. The apparatus of claim 40 wherein said predetermined design parameter includes one of the disc recording capacity, disc type, and disc format.

42. The apparatus of claim 30 wherein said design parameter discriminating holes are formed on a straight line substantially perpendicular to the cartridge inserting direction.

43. The apparatus of claim 42 wherein said plurality of design parameter discriminating holes includes a recording capacity discriminating hole for discriminating the recording capacity of the information signals.

44. The apparatus of claim 43 wherein the main cartridge body member is made up of an upper half and a lower half, combined together, said upper half and the lower half being of different colors.

45. The apparatus of claim 44 wherein said predetermined design parameter includes one of the disc recording capacity, disc type, and disc format.

46. The apparatus of claim 30 wherein said plurality of design parameter discriminating holes includes a recording capacity discriminating hole for discriminating the recording capacity of the information signals.

47. The apparatus of claim 46 wherein the main cartridge body member is made up of an upper half and a lower half, combined together, said upper half and the lower half being of different colors.

48. The apparatus of claim 47 wherein said predetermined design parameter includes one of the disc recording capacity, disc type, and disc format.

49. The apparatus of claim 30 wherein the main cartridge body member is made up of an upper half and a lower half, combined together, said upper half and the lower half being of different colors.

50. The apparatus of claim 49 wherein said predetermined design parameter includes one of the disc recording capacity, disc type, and disc format.

51. The apparatus of claim 30 wherein said predetermined design parameter includes one of the disc recording capacity, disc type, and disc format.

* * * * *